United States Patent
Boduch et al.

(10) Patent No.: US 7,327,747 B2
(45) Date of Patent: Feb. 5, 2008

(54) SYSTEM AND METHOD FOR COMMUNICATING DATA USING A COMMON SWITCH FABRIC

(75) Inventors: Mark E. Boduch, Geneva, IL (US); David G. Rancich, Naperville, IL (US); Lawrence D. Weizeorick, Lisle, IL (US); Chris R. Zettinger, Wheaton, IL (US)

(73) Assignee: Tellabs Operations, Inc., Naperville, IL (US)

( * ) Notice: Subject to any disclaimer, the term of this patent is extended or adjusted under 35 U.S.C. 154(b) by 828 days.

(21) Appl. No.: 10/232,339

(22) Filed: Aug. 30, 2002

(65) Prior Publication Data

US 2003/0043810 A1 Mar. 6, 2003

Related U.S. Application Data

(60) Provisional application No. 60/316,647, filed on Aug. 30, 2001.

(51) Int. Cl.
*H04L 12/54* (2006.01)
(52) U.S. Cl. .................................. 370/412; 370/429
(58) Field of Classification Search ........ 370/351–356, 370/389, 392, 395.42, 395.43, 400, 401, 370/412–414, 419, 420, 422, 428, 429, 386–388
See application file for complete search history.

(56) References Cited

U.S. PATENT DOCUMENTS 5,144,619 A  9/1992 Munter
5,256,958 A  10/1993 Eng et al.

(Continued)

FOREIGN PATENT DOCUMENTS

EP  1 093 266  4/2001

OTHER PUBLICATIONS

Shim, et al. "On Priority Scheduling Algorithm at ATM Switches with Multi-Class Output Buffers", IEICE Transactions on Communications, Institute of Electronics Information and Comm. Eng., vol. E82-B, No. 1, Jan. 1999, pp. 34-38.
Park, et al. "A Buffer Management Scheme with Scalable Priorities (SPAS) for Multi-QoS Services in ATM Switching Systems" IEICE Transactions on Communications, Institute of Electronics Information and Comm. Eng., vol. E82-B, No. 4, Apr. 1999, pp. 655-659.

*Primary Examiner*—Wing Chan
*Assistant Examiner*—Duc Duong
(74) *Attorney, Agent, or Firm*—Baker Botts L.L.P.

(57) ABSTRACT

A communication system includes a first ingress content processor that receives information associated with a first traffic type. The first ingress content processor places the information associated with the first traffic type into a system cell having a common system cell format. A second ingress content processor receives information associated with a second traffic type. The second ingress content processor places the information associated with the second traffic type into a system cell having the common system cell format. A switch fabric receives system cells from the first and second ingress content processors. System cells from the first ingress content processor are automatically sent to the switch fabric while system cells from the second ingress content processor are required to be scheduled before being sent to the switch fabric. The switch fabric separately queues system cells carrying payloads associated with the first traffic type from system cells carrying payloads associated with the second traffic type. The switch fabric services system cells carrying payloads associated with the first traffic type prior to servicing system cells carrying payloads associated with the second traffic type.

13 Claims, 14 Drawing Sheets

U.S. PATENT DOCUMENTS

| | | |
|---|---|---|
| 5,285,441 A | 2/1994 | Bansal et al. |
| 5,436,886 A | 7/1995 | McGill |
| 5,764,637 A | 6/1998 | Nishihara |
| 5,864,542 A * | 1/1999 | Gupta et al. ............... 370/257 |
| 6,167,041 A | 12/2000 | Afanador |
| 6,259,699 B1 * | 7/2001 | Opalka et al. ............. 370/398 |
| 6,519,261 B1 * | 2/2003 | Brueckheimer et al. .................. 370/395.52 |
| 6,646,983 B1 * | 11/2003 | Roy et al. .................. 370/218 |
| 6,665,495 B1 * | 12/2003 | Miles et al. ................. 398/54 |
| 6,674,750 B1 * | 1/2004 | Castellano ................ 370/354 |
| 6,678,271 B1 * | 1/2004 | Flinsbaugh ............... 370/392 |
| 6,778,529 B1 * | 8/2004 | Field et al. ............... 370/353 |
| 7,023,841 B2 * | 4/2006 | Dell et al. ................. 370/388 |

* cited by examiner

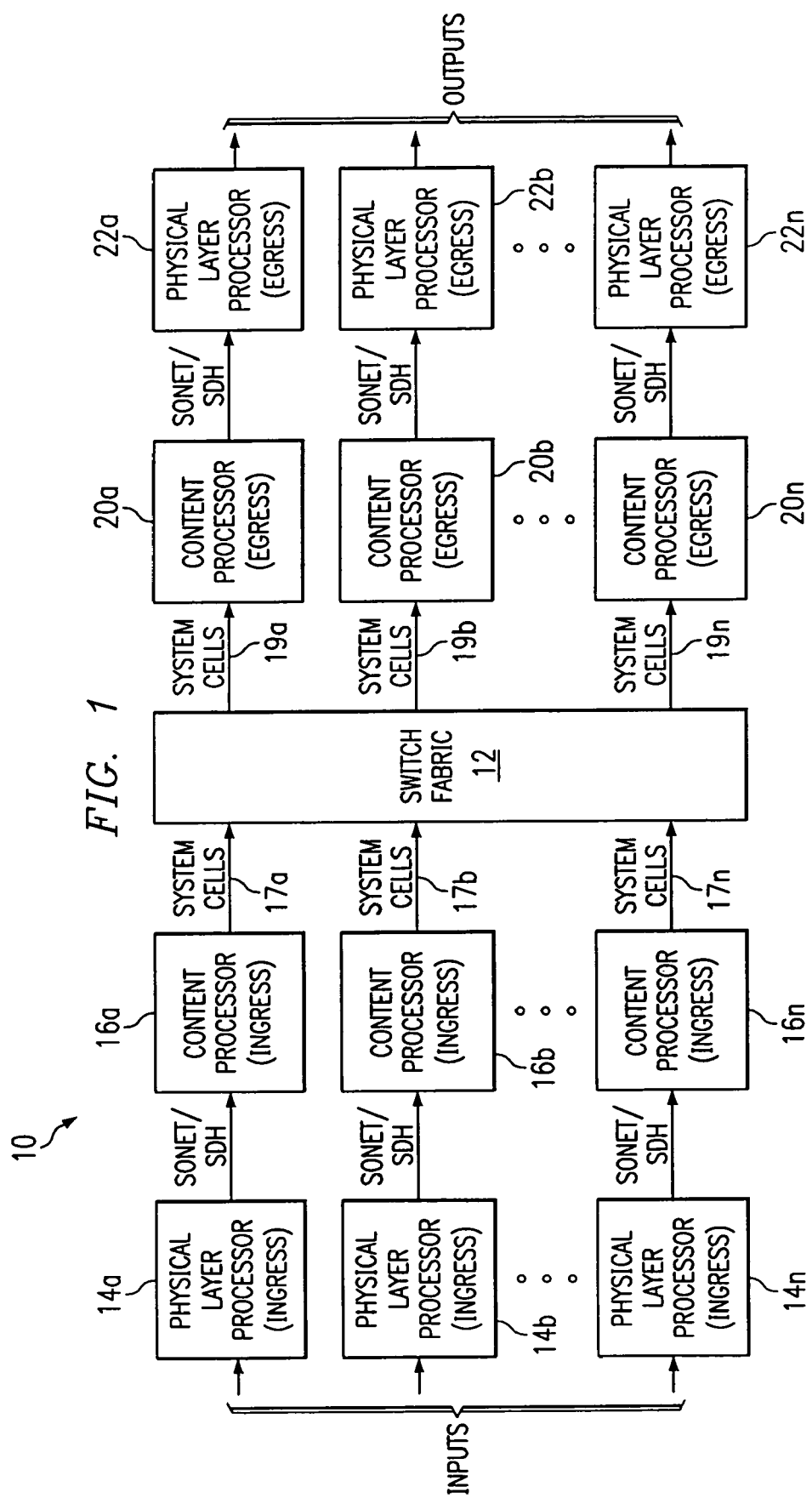

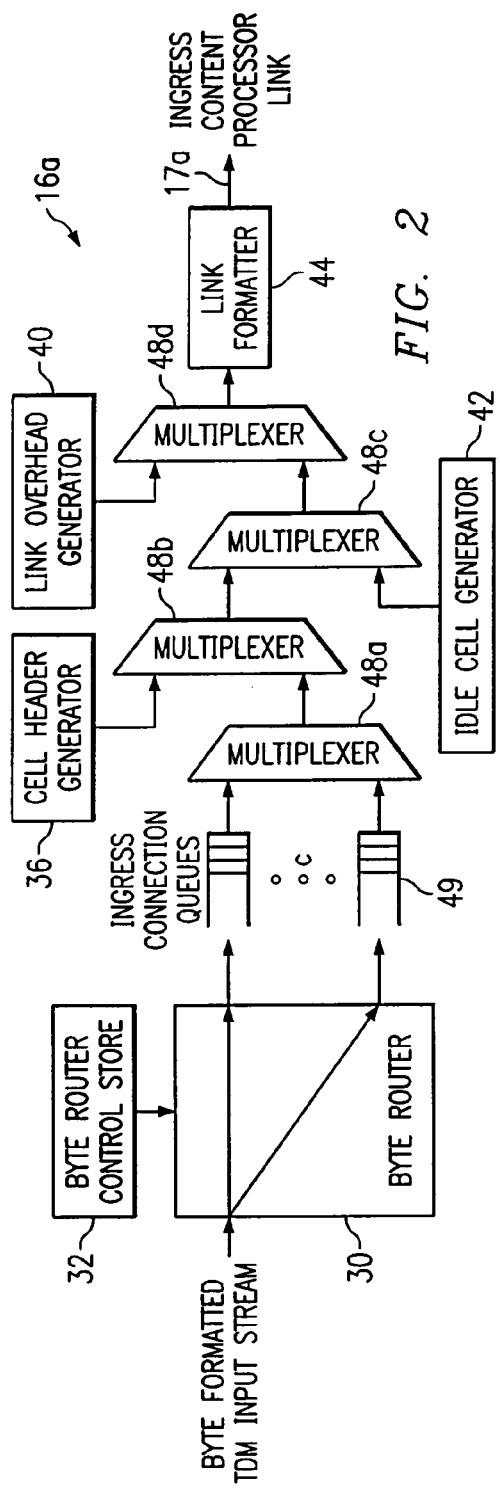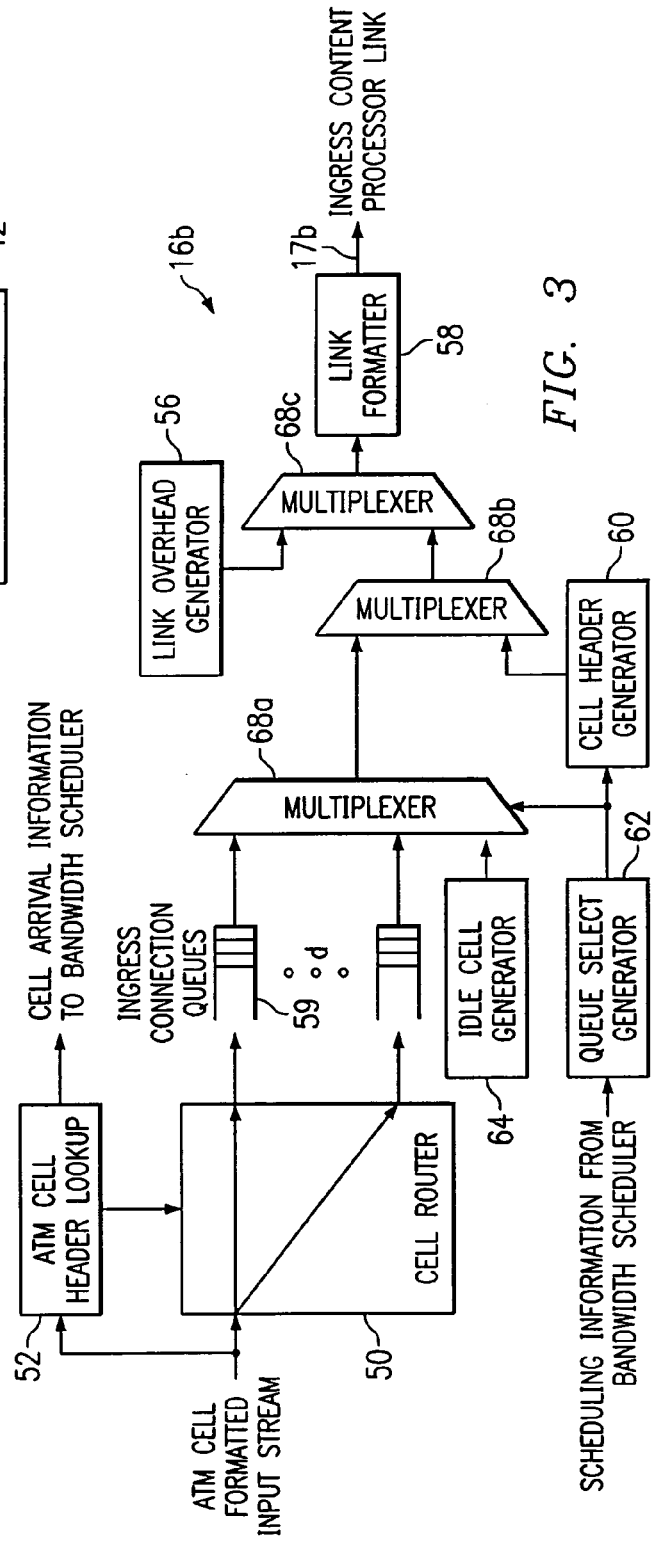

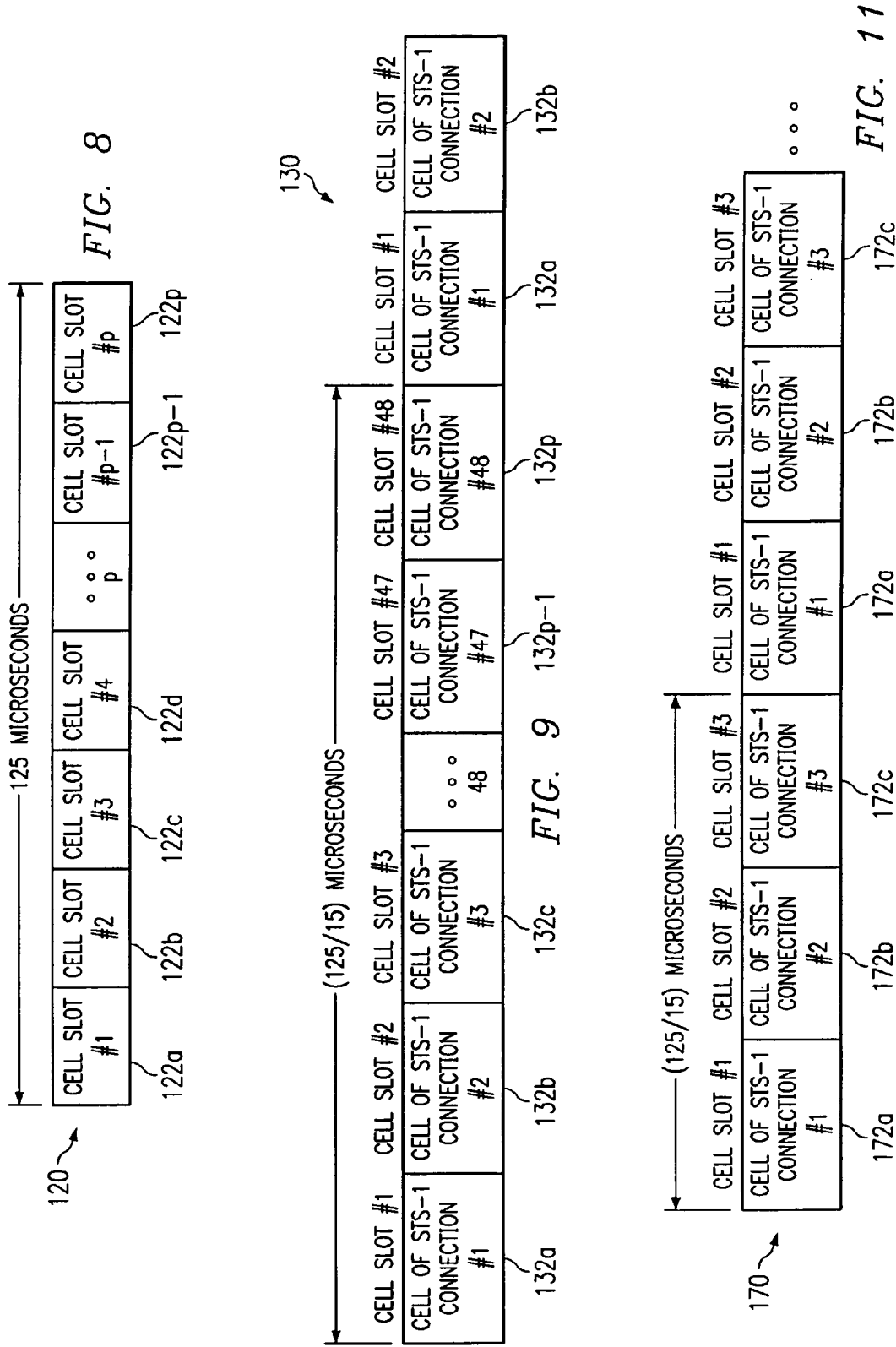

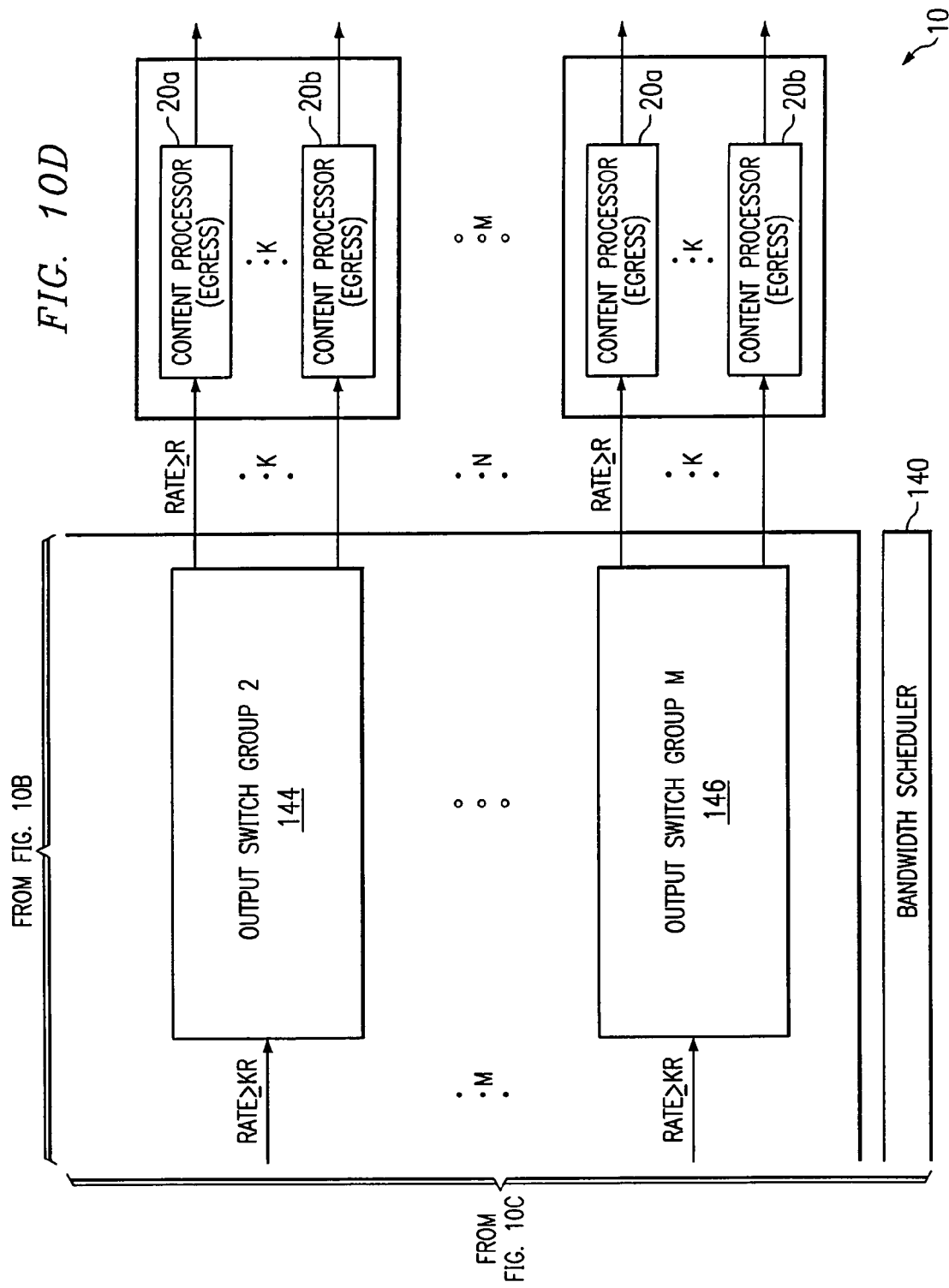

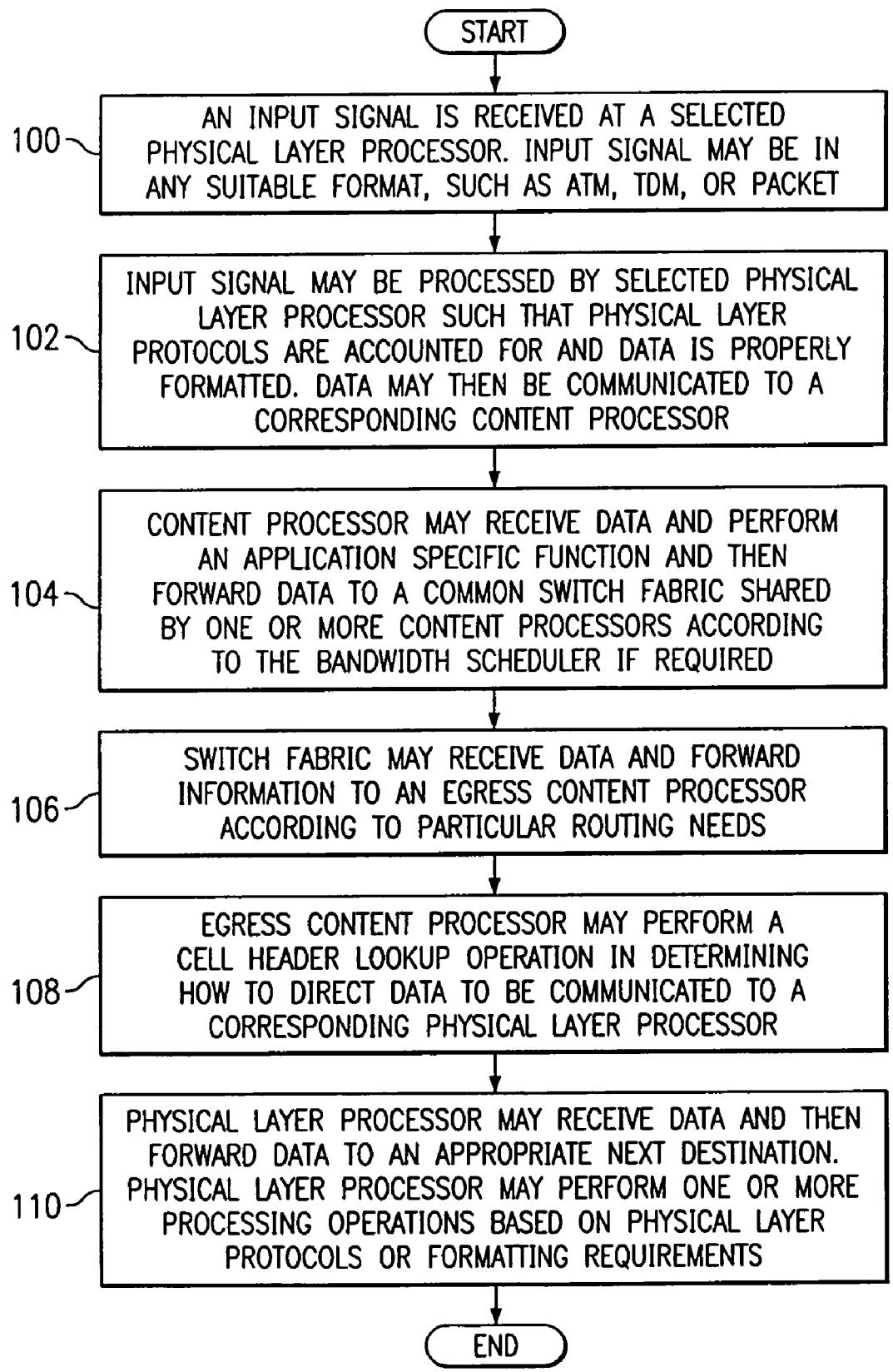

SYSTEM AND METHOD FOR COMMUNICATING DATA USING A COMMON SWITCH FABRIC

RELATED APPLICATIONS

This application claims priority under 35 U.S.C. §119 of U.S. Provisional Application No. 60/316,647 entitled "Method and Apparatus for Forwarding Cells, Packets, and SONET/SDH Payloads in Common Switch Fabric" filed Aug. 30, 2001.

TECHNICAL FIELD OF THE INVENTION

This invention relates in general to the field of communications and more particularly to a system and method for communicating data using a common switch fabric.

BACKGROUND OF THE INVENTION

Network architectures have grown increasingly complex in existing communication systems. One reason for this complexity is due to the various communications protocols that may be propagating through a given system concurrently. Each of the various communications protocols may include specific processing operations or procedures that facilitate the routing, transmission, and reception of data or information. Properly accommodating each communications protocol presents a significant challenge for system designers and network engineers. Additionally, in attempting to manage various communications protocols simultaneously, it is important that high operational speeds are maintained. Accordingly, it may be important to minimize system overflows or points of congestion as information is adequately directed to specific elements that are capable of processing the particular communications protocol. Bottlenecks that are produced by system overflows, improper direction of data, or inadequate processing of information may inhibit communication speeds and further limit bandwidth allocations for a corresponding communications architecture.

SUMMARY OF THE INVENTION

From the foregoing, it may be appreciated by those skilled in the art that a need has arisen for an improved approach for communicating data associated with multiple communications protocols. In accordance with one embodiment of the present invention, a system and method for communicating data using a common switch fabric are provided that substantially eliminate or greatly reduce disadvantages and problems associated with conventional data management techniques.

According to an embodiment of the present invention, there is provided an apparatus for communicating data in a network environment that includes a switch fabric that receives a plurality of system cells. Each system cell carries a payload associated with one of a plurality of traffic types. A first one of the plurality of traffic types has a higher priority than other ones of the plurality of traffic types. System cells carrying payloads associated with the first one of the plurality of traffic types are transported automatically while system cells carrying payloads associated with the other ones of the plurality of traffic types require scheduling before being transported. The switch fabric separately queues system cells carrying payloads associated with the first one of the plurality of traffic types from system cells carrying payloads associated with other ones of the plurality of traffic types. The switch fabric services system cells carrying payloads associated with the first one of the plurality of traffic types prior to servicing system cells carrying payloads associated with other ones of the plurality of traffic types. The plurality of traffic types may include time division multiplexed, asynchronous transfer mode, and Internet Protocol formats with priority given to time division multiplexed traffic.

The present invention provides various technical advantages over conventional data management techniques. Some of these technical advantages are shown and described in the description of the present invention. Embodiments of the present invention may enjoy some, all, or none of these advantages. Other technical advantages may be readily apparent to one skilled in the art from the following figures, description, and claims.

BRIEF DESCRIPTION OF THE DRAWINGS

To provide a more complete understanding of the present invention and features and advantages thereof, reference is made to the following description, taken in conjunction with the accompanying figures, wherein like reference numerals represent like parts, in which:

FIG. 1 is a simplified block diagram of a communications system for processing data associated with a plurality of communication protocols;

FIG. 2 is a simplified block diagram of an ingress time division multiplex (TDM) content processor included within the communications system;

FIG. 3 is a simplified block diagram of an ingress asynchronous transfer mode (ATM) content processor included within the communications system;

FIG. 8 is a block diagram of an example content processor link format;

FIG. 9 is a block diagram of an example time division multiplex (TDM) ingress content processor link format;

FIGS. 10A-D are a simplified block diagram of an example system implementation for a switch fabric of the communication system;

FIG. 11 is a block diagram of an example STS-3 content processor link format for the switch fabric;

FIG. 16 is a flowchart illustrating a series of example steps associated with a method for communicating data using the switch fabric in the communication system.

DETAILED DESCRIPTION OF THE INVENTION

Figure 4:
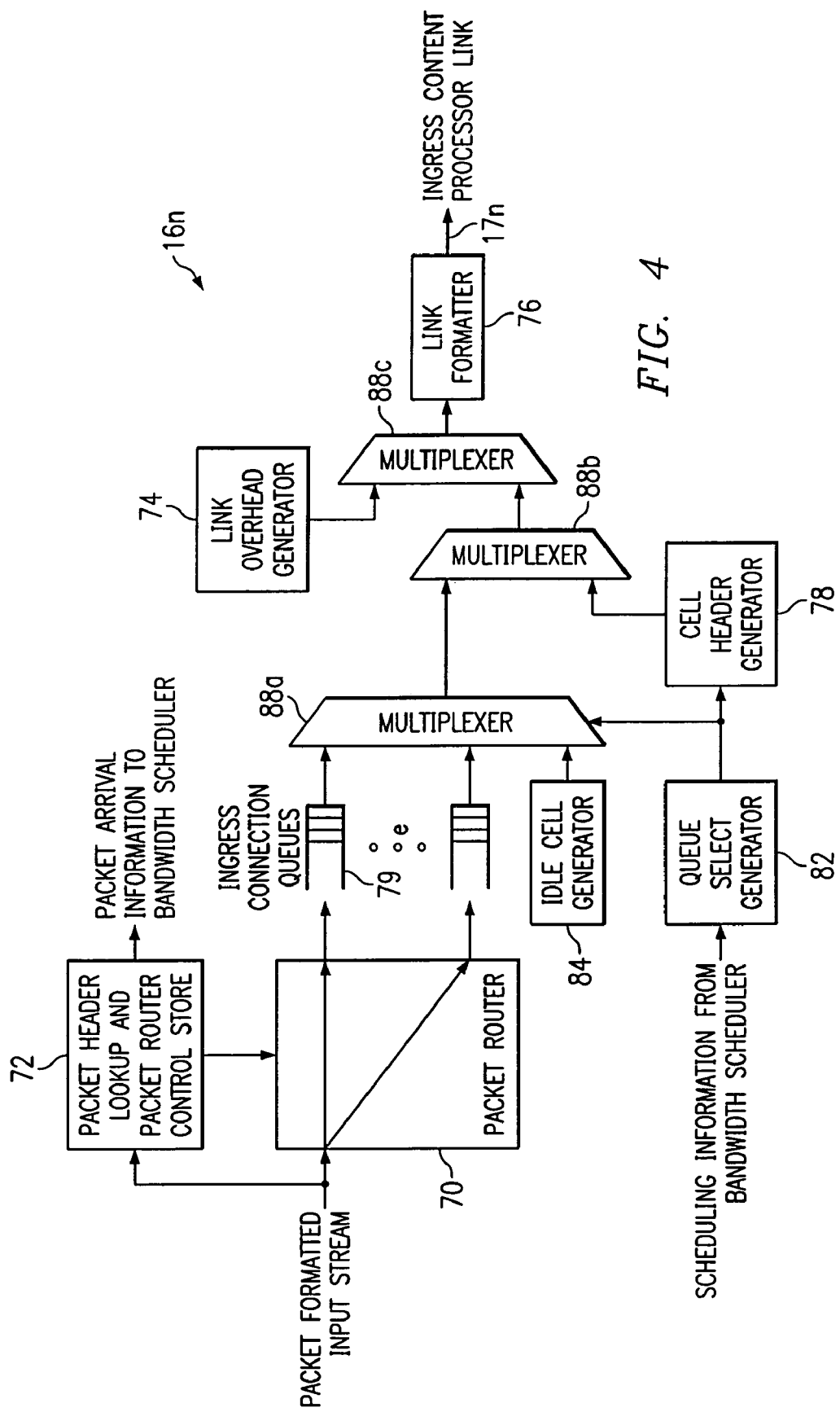
FIG. 4 is a simplified block diagram of an ingress packet content processor included within the communications system.

FIG. 1 is a simplified block diagram of a communication system 10 for processing data associated with a plurality of communication protocols in accordance with one embodiment of the present invention. Communication system 10 may be positioned at any suitable location within or external to a communications architecture in order to facilitate the delivery, transmission, or switching of information or data in a network environment. Communication system 10 may include a switch fabric 12, a set of ingress physical layer processors 14a-n, and a set of ingress content processors 16a-n. Communication system 10 may also include a set of egress content processors 20a-n and a set of egress physical layer processors 22a-n.

In accordance with the teachings of the present invention, communication system 10 operates to provide a communications platform that allows for multiple types of information or data to be communicated in a network environment. The information or data may be associated with various types of communications protocols having particular formats and/or processing requirements. These comminations protocols may be associated with information in a time division multiplex (TDM) format, an asynchronous transfer mode (ATM) format, an internet protocol (IP) packet-based format, or any other suitable format in accordance with particular needs. For purposes of discussion only, the description of communication system 10 is based on but not limited to the TDM, ATM, and IP formats. Switch fabric 12 may provide a common fabric interfacing element that forwards, directs, manages, or otherwise communicates various information segments to a suitable next destination.

Communication system 10 allows for increased stability and enhanced communications of data propagating through switch fabric 12. This is a result of one or more buffers of data cells in a corresponding set of queues that protect against potential system overflow or network congestion. This may also be a result of one or more memory elements within switch fabric 12 that are properly utilized such that additional memory elements are not required. Proper utilization of memory elements is significant in the case where the memory elements present a relatively large expense to a system designer or occupy valuable space on an associated integrated circuit chip.

Switch fabric 12 provides considerable flexibility to communication system 10 because it accounts for various types of data propagating within the corresponding network. Switch fabric 12 may represent an amalgamation of one or more functionalities provided by multiple network elements, such as an ATM switch, an IP router, and a digital cross-connect system, for example. This single network element may allow a communications architecture to transition from a TDM circuit switched-based communication to a cell and/or packet-based communication while utilizing a single network interface. Thus, various communications protocols may be accommodated for in the network without having to change components or to direct diverse communications protocols to another suitable network component based on particular transmission or processing needs.

Switch fabric 12 is a communications element that represents a common switching interface positioned between ingress content processors 16a-n and egress content processors 20-n. Switch fabric 12 may include suitable hardware, software, components, or elements operable to facilitate the management, direction, or communication of data or information. Switch fabric 12 accommodates various types of data or information communicated by ingress content processors 16a-n. Switch fabric 12 may include a control processor (and support permanent virtual connection applications) and distributed stacks for other suitable communication applications. Switch fabric 12 may also include a multiplexer or a demultiplexer that operate to compress or decompress incoming data at any suitable ratio, such as 1:8 or 8:1 for example, over suitable communications links. Switch fabric 12 may additionally include other suitable elements that facilitate the delivery, transmission, or processing of various types of data or information.

In an example embodiment, communication system 10 may represent a networking architecture that includes multiple content processors and an N by N cell-based switch fabric 12. Thus, N content processors may be provided, with each content processor including an ingress and an egress portion. Each ingress content processor 16a-n may create a stream of system cells based on the information that is received from its synchronous optical network (SONET)/synchronous digital hierarchy (SDH) inputs. System Cells may be forwarded to the N by N switch fabric 12 via ingress content processor links 17a-n and leave switch fabric 12 via egress content processor links 19a-n. A given content processor link (either ingress or egress) may transport system cells that contain only a single data type (e.g., TDM data, ATM data, or packet data). However, because certain types of data share similar intrinsic properties (for example ATM and packet system cells share similar characteristics) a given content processor may be used to process both ATM and packet type system cells. Once at the N by N switch fabric 12, each system cell may be forwarded to its destination egress content processor via the switching mechanism that is contained within switch fabric 12.

Multiple types of ingress physical layer processors 14a-n or egress physical layer processors 22a-n may be included within communication system 10. For example, physical layer processors may be provided that interface with SONET OC-12 facilities, SONET OC-48 facilities, or SONET OC-192 facilities as well as DS3 and STS-1E electrical facilities. Each of ingress physical layer processors 14a-n and egress physical layer processors 22a-n may include suitable hardware, software, components, or elements operable to facilitate the management, direction, or communication of data or information to and from corresponding content processors. One operation provided by each of ingress physical layer processors 14a-n and egress physical layer processors 22a-n may be to process any physical layer protocols associated with specific communications protocols and/or to format the available data into a common format that can be understood by a selected content processor type. For example, the common format between one or more ingress physical layer processors and one or more content processors in communication system 10 may be SONET/SDH based. In operation of an example embodiment of ingress physical layer processors 14a-n or egress physical layer processors 22a-n, a T1/DS1, T3/DS3, OC-12 or OC-48 type physical layer processor may map/de-map a corresponding data signal into/from a SONET payload before forwarding/receiving the data signal to/from an associated ingress or egress content processor.

Communication system 10 may also include multiple types of ingress content processors 16a-n and egress content processors 20a-n. For example, ingress content processor 16a, 16b, and 16n may be associated with information in a TDM, ATM, and packet format respectively. Each of ingress content processors 16a-n and egress content processors 20a-n may include suitable hardware, software, components, or elements operable to facilitate the management, direction, or communication of data or information to and from switch fabric 12. Each content processor may suitably perform its application specific function and, where appropriate, map/de-map its data content into/from system cells that may be processed by switch fabric 12. Switch fabric 12 may be cell-based and used to forward system cells from its inputs to one or more of its outputs. Because one or more system cells from the various content processor types may have generally different forwarding requirements (for example with respect to cell loss, cell transfer delay, and cell delay variation), switch fabric 12 may be capable of forwarding a cell based on its specific forwarding system needs.

FIG. 2 is a simplified block diagram of ingress content processor 16a included within communication system 10 and offers additional details relating to the elements included therein. Ingress content processor 16a is operable to process information in a TDM format in accordance with an example embodiment of the present invention. Ingress content processor 16a may include a byte router 30, a byte router control store 32, a cell header generator 36, a link overhead generator 40, an idle cell generator 42, a link formatter 44, and a set of multiplexers 48a-d. These elements may receive an incoming signal from ingress physical layer processor 14a and suitably process the incoming signal such that it may be routed to switch fabric 12.

Ingress content processor 16a may operate on a byte formatted TDM input stream that contains "c" number of byte interleaved channels. There may be an individual ingress connection queue 49 associated with each of the "c" channels. The bytes associated with a given channel may be routed to a corresponding ingress connection queue 49 via byte router 30 which communicates with byte router control store 32. Byte router 30 may be programmable in order to allow for the case where multiple channels are concatenated together in order to form a connection having a larger bandwidth. A TDM carrying system cell may be formed by emptying a fixed number of bytes from a particular ingress connection queue 49 and then attaching a cell header to this fixed number of bytes. The cell header may be produced by cell header generator 36 and provides information that is used by switch fabric 12 in order to properly forward or communicate the system cell to a suitable next destination.

Ingress content processor link 17a may be formed by multiplexing system cells formed from multiple ingress connection queues 49 onto a common link. In order to form a link that includes a continuous stream of system cells, idle system cells may be generated by idle cell generator 42 and multiplexed onto ingress content processor link 17a during periods where there are not connection queue system cells available for transmission. Link formatter 44 may then receive resultant system cells via multiplexer 48d and forward the information onto the ingress content processor link 17a to be communicated to switch fabric 12.

FIG. 3 is a simplified block diagram of ingress content processor 16b included within communication system 10 and offers additional details relating to the elements included therein. Ingress content processor 16b may accommodate ATM data in a network environment and be inclusive of an ATM cell router 50, an ATM cell header lookup 52, a link overhead generator 56, a link formatter 58, and a cell header generator 60. Ingress content processor 16b may also include a queue select generator 62, an idle cell generator 64, and a set of multiplexers 68a-c. These elements may cooperate in order to suitably process information or data that is in an ATM format such that the data may be properly communicated to switch fabric 12.

Ingress content processor 16b may operate on an ATM formatted input stream that contains "d" number of connections. An individual ingress connection queue 59 associated with each of the "d" connections may also be provided. The ATM cells associated with a given connection may be routed to the corresponding ingress connection queue 59 via cell router 50. In order to do this, a lookup operation may be performed by ATM cell header lookup 52 on the virtual path identifier/virtual channel identifier (VPI/VCI) field that is contained within the header of an incoming ATM cell. The result of this lookup may determine to which ingress connection queue 59 the cell is forwarded.

An ATM carrying system cell may be formed by emptying an ATM cell from a particular ingress connection queue 59, and then attaching a cell header to the system cell using cell header generator 60. As in the case when forming TDM-carrying system cells, ingress content processor link 17b may be formed by multiplexing system cells from multiple ingress connection queues 59 onto a common link. Queue select generator 62 may select the appropriate ingress connection queue 59 based on information from a bandwidth scheduler. In order to form a link that includes a continuous stream of system cells, idle cells may be generated by idle cell generator 64 and multiplexed onto ingress content processor link 17b during periods where there are not connection queue system cells available for transmission. Link overhead generator 56 may provide additional routing data to the system cell stream in accordance with particular needs. Link formatter 58 may then receive the resultant system cells via multiplexer 68c and forward the information to the ingress content processor link 17b to be communicated to switch fabric 12.

FIG. 4 is a simplified block diagram of ingress content processor 16n included within communication system 10. Ingress content processor 16n may receive and suitably process information that is in an IP packet format. Ingress content processor 16n may include a packet router 70, a packet header lookup 72, a link overhead generator 74, and a link formatter 76. Ingress content processor 16n may also include a queue select generator 82, an idle cell generator 84, and a set of multiplexers 88a-c. These elements may cooperate in order to process information included within an incoming signal that is in an IP packet format. The processed IP packet data may then be properly forwarded to switch fabric 12 and subsequently communicated to a suitable egress element.

Ingress content processor 16n operates on an IP packet formatted input stream that contains "e" number of connections. There may be an individual ingress connection queue 79 associated with each of the "e" connections. An ingress connection queue 79 may be an internal system notation used to group IP packets together that have the same network destination and similar class of service. The IP packets associated with a given connection may be routed to the corresponding ingress connection queue 79 via packet router 70. In order to do this, a lookup operation may be performed by packet header lookup 72 on the various fields that are contained within the header of an incoming IP packet. The result of this lookup may determine to which connection queue 79 the IP packet is forwarded.

An IP packet carrying system cell may be formed by emptying a fixed number of IP packet bytes from a particular connection queue 79 and then attaching a cell header to the corresponding system cell that is formed. This may be executed by cell header generator 78. Alternatively, IP packets may be first mapped to ATM cells prior to being mapped to system cells. As in the example case associated with forming TDM or ATM carrying system cells, ingress content processor link 17*n* may be formed by multiplexing system cells formed from multiple ingress connection queues 79 onto a common link. Queue select generator 82 may select an appropriate ingress connection queue 79 based on information from a bandwidth scheduler.

In order to form a link that includes a continuous stream of system cells, idle cells may be generated by idle cell generator 84 and multiplexed onto ingress content processor link 17*n* during periods where there are not connection queue system cells available for transmission. Link overhead generator 74 may provide additional routing data to the system cell stream in accordance with particular needs. Link formatter 76 may then receive the resultant system cells via multiplexer 88*c* and forward the information to the ingress content processor link 17*n* to be communicated to switch fabric 12.

Figure 5:
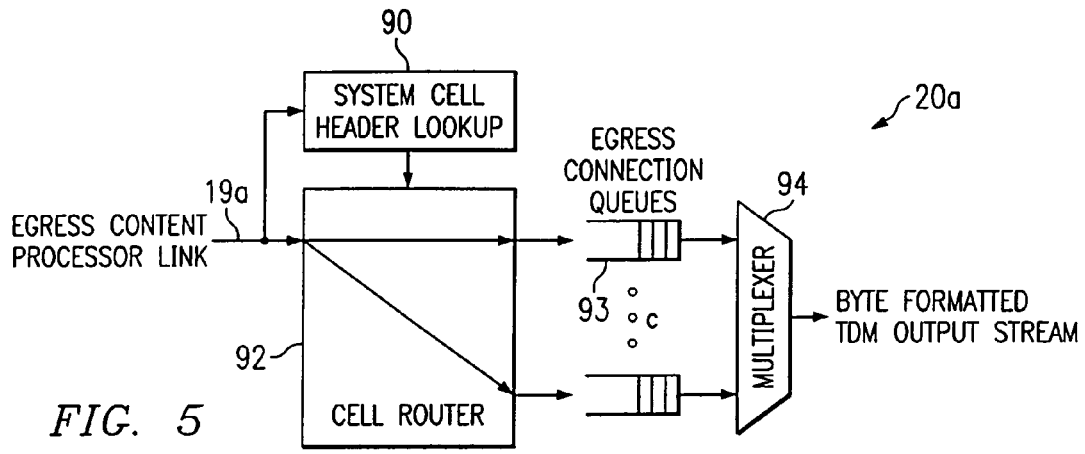
FIG. 5 is a simplified block diagram of an egress TDM content processor included within the communications system.

FIG. 5 is a simplified block diagram of egress content processor 20*a* included within communication system 10. Egress content processor 20*a* may be coupled to switch fabric 12 and inclusive of a system cell header lookup 90, a system cell router 92, and a multiplexer 94. These elements may cooperate in order to receive a data stream of system cells from switch fabric 12 and communicate that data stream to an associated egress physical layer processor 22*a*.

Egress content processor 20*a* may generate a byte formatted TDM output stream that contains "c" number of byte interleaved channels. An individual egress connection queue 93 associated with each of the "c" channels may also be provided. In an example operation, system cells may arrive at egress content processor 20*a* via egress content processor link 19*a*. The system cell header of each system cell may be forwarded to system cell header lookup 90. Based on information that is contained within the system cell header, the non-header bytes of the system cell may be forwarded to the correct egress connection queue 93. Bytes may then be read out of the egress connection queues 93 in a round robin fashion (or any other suitable manner) in order to generate the byte formatted TDM output stream containing "c" number of channels. The output may be properly forwarded to multiplexer 94 and then suitably formatted such that it is communicated to egress physical layer processor 22*a* in a TDM output stream of information.

Figure 6:
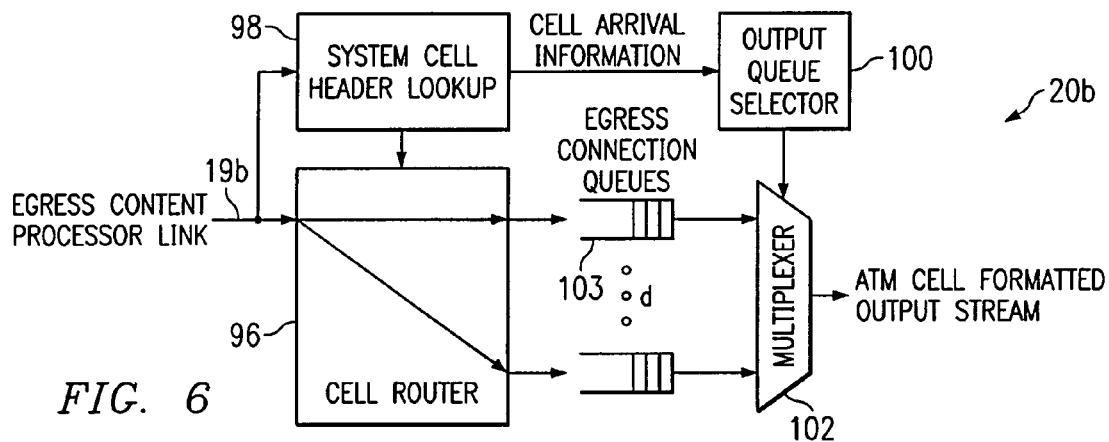
FIG. 6 is a simplified block diagram of an egress ATM content processor included within the communications system.

FIG. 6 is a simplified block diagram of egress content processor 20*b* that is included within communication system 10. Egress content processor 20*b* may generate ATM cell data or information and be inclusive of a system cell router 96, a system cell header lookup 98, an output queue selector 100, and a multiplexer 102. These elements may cooperate in order to receive a data stream of system cells from switch fabric 12 and properly forward the data stream to an associated egress physical layer processor 22*b* after suitable processing has been executed. Egress content processor 20*b* may generate an ATM cell formatted output stream that contains "d" number of connections. An individual egress connection queue 103 associated with each of the "d" connections may be provided.

In operation of an example embodiment, ATM type system cells may arrive at egress content processor 20*b* via egress content processor link 19*b*. The system cell header of each system cell may then be forwarded to system cell header lookup 98. Based on information that may be included within the system cell header, the non-header bytes of the system cell may be forwarded to the correct egress connection queue 103. ATM cells may then be read out of egress connection queues 103 according to output queue selector 100 in order to generate the ATM cell formatted output stream containing "d" number of connections. Output queue selector 100 may make its selection based on both cell arrival information and software programmable connection configuration information.

Egress connection queues 103 are provided within egress content processor 20*b* for the case where: 1) the maximum possible cell arrival rate on egress content processor link 19*b* is greater than the maximum possible cell departure rate on the ATM cell formatted output stream, and/or 2) the ATM cell formatted output stream feeds multiple lower rate physical interfaces. Individual egress connection queues 103 may prevent higher priority cells from getting backed up behind lower priority cells. Information in egress connection queues 103 may be properly forwarded to multiplexer 102 and then suitably formatted where appropriate such that the information is communicated to egress physical layer processor 22*b* in an ATM cell formatted output stream of information.

Figure 7:
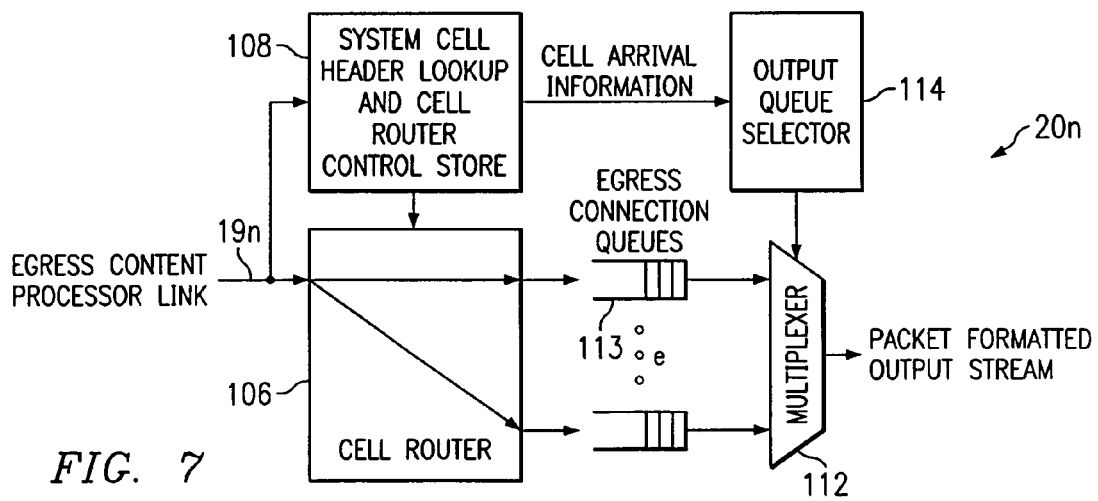
FIG. 7 is a simplified block diagram of an egress packet content processor included within the communications system.
Figure 10A:
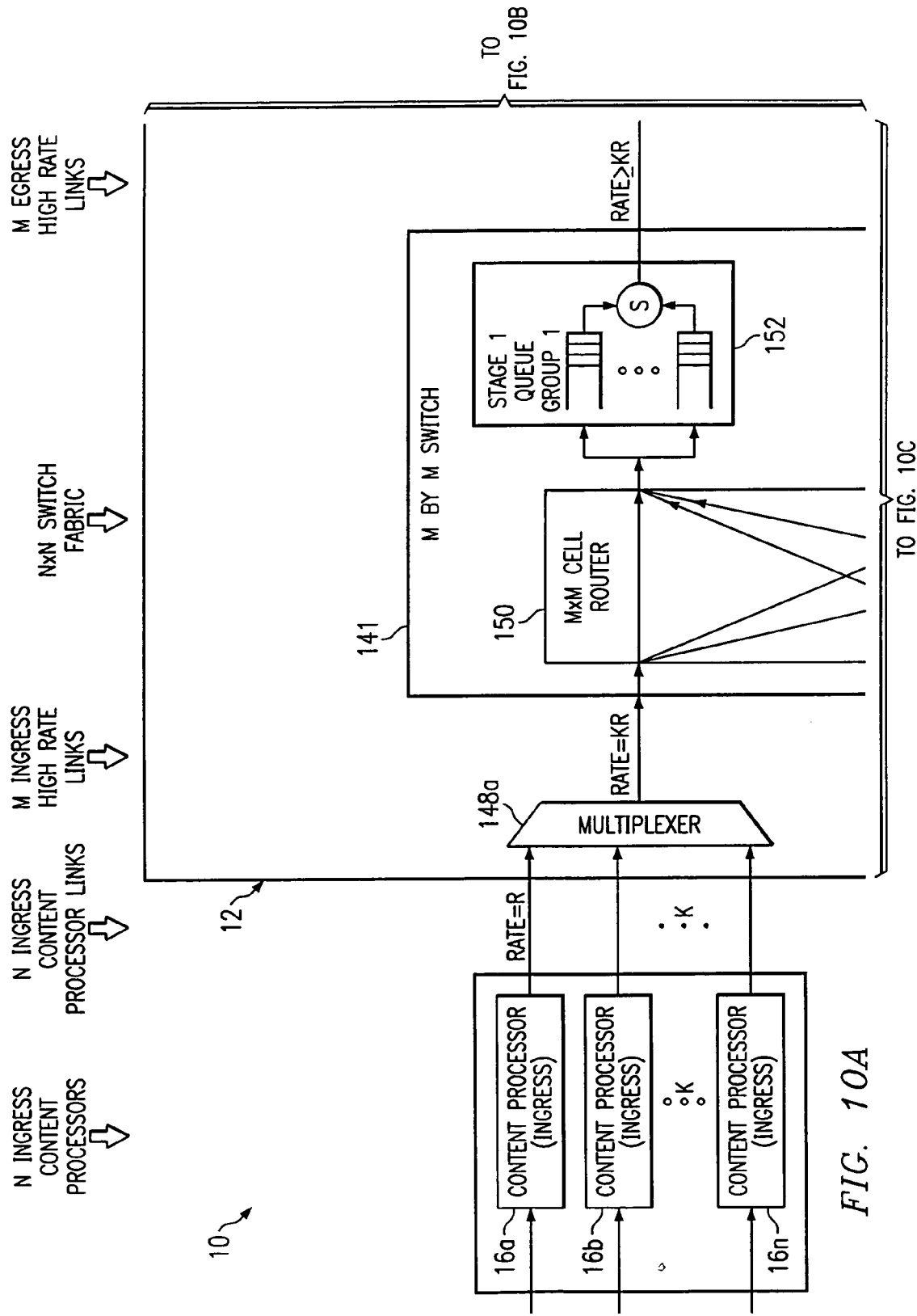
Figure 10B:
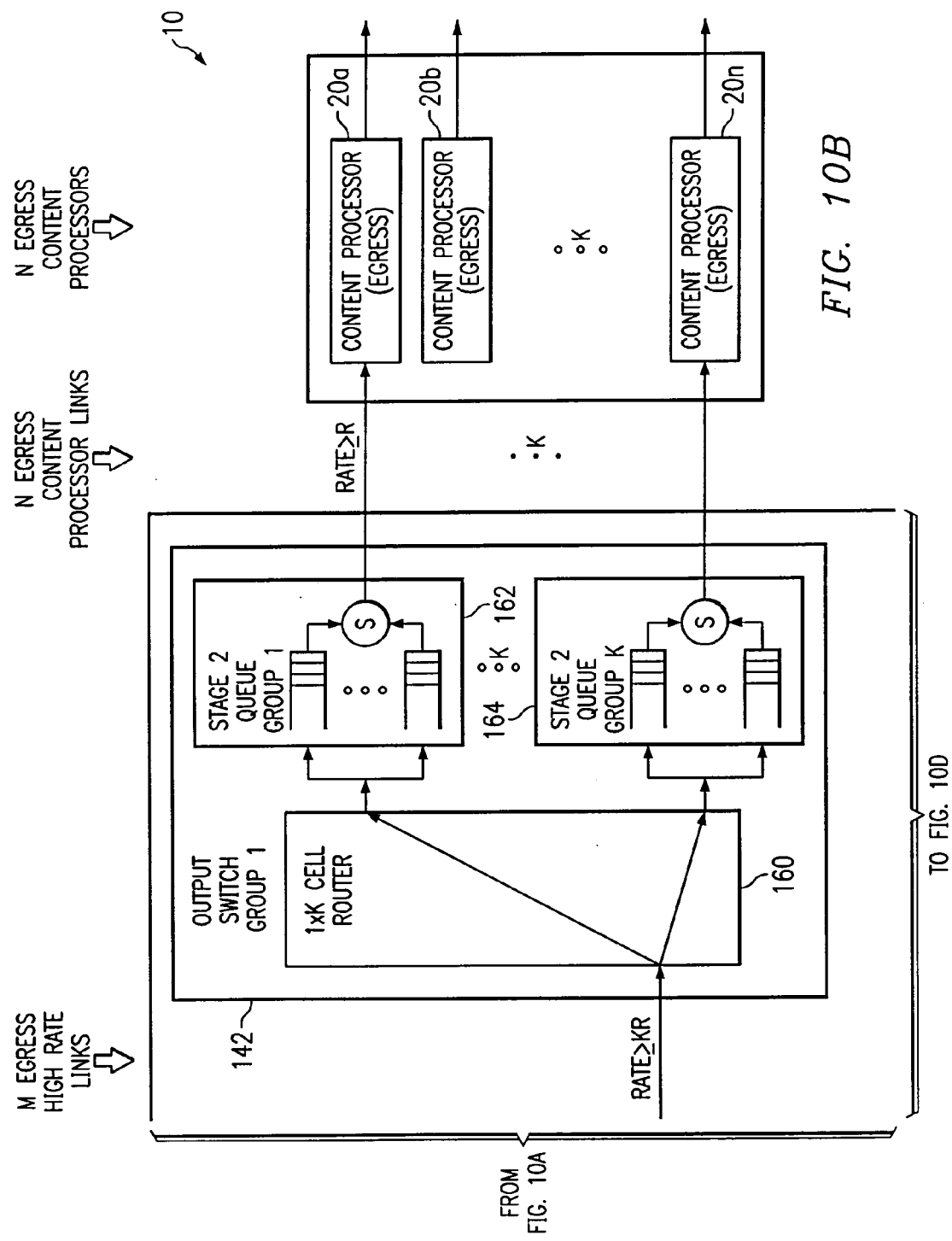
Figure 10C:
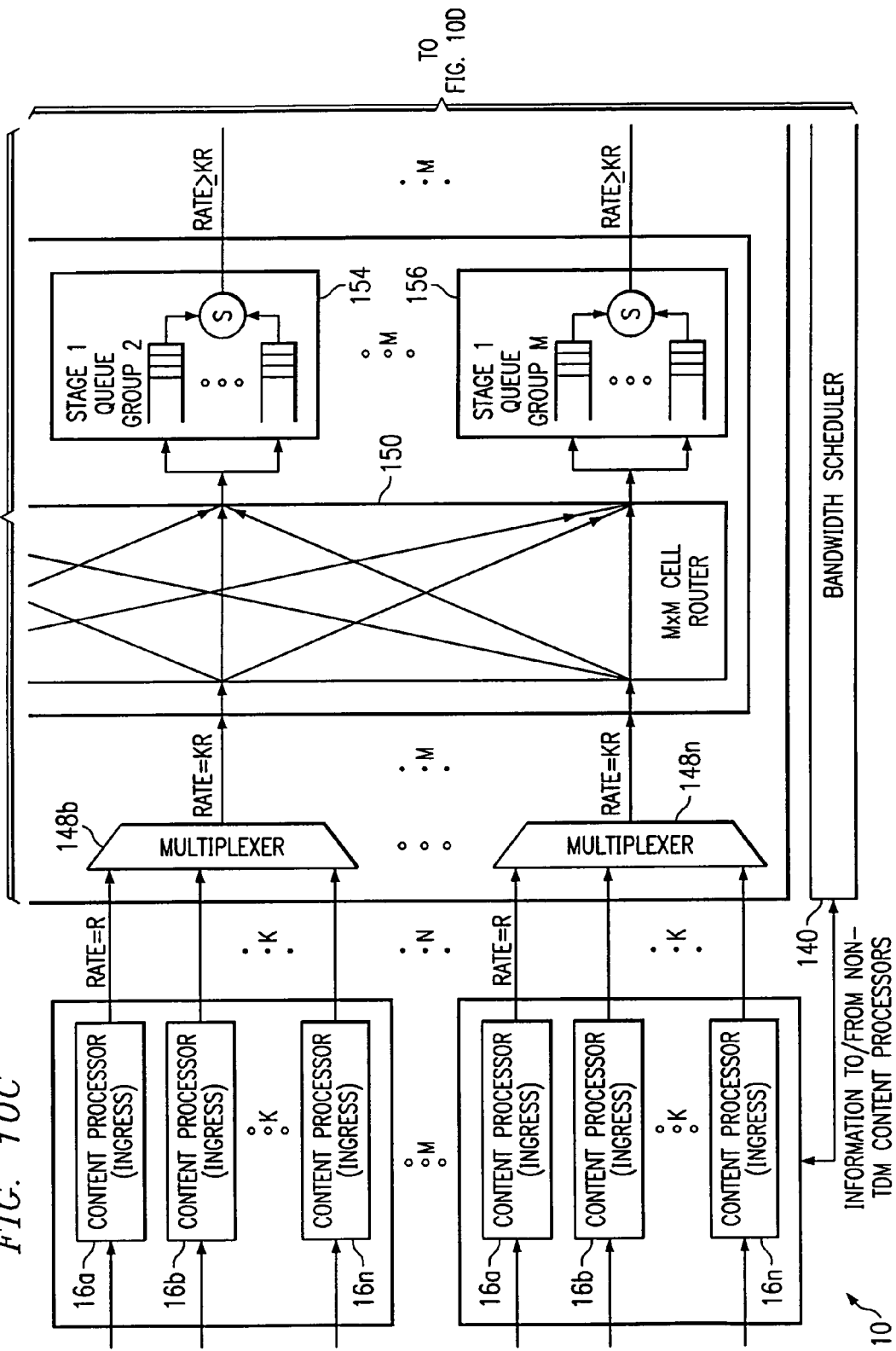

FIG. 7 is a simplified block diagram of egress content processor 20*n* that may be included within communication system 10. Egress content processor 20*n* may receive system cells from switch fabric 12 and suitably process the information such that it may be properly forwarded to an associated egress physical layer processor 22*n*. Egress content processor 20*n* may include a system cell router 106, a system cell header lookup 108, an output queue selector 114, and a multiplexer 112. These elements may cooperate in order to suitably process a data stream of system cells and properly communicate this information to corresponding egress physical layer processor 22*n*.

Egress content processor 20*n* may generate a packet formatted output stream that contains "e" number of connections. A connection may be an internal system notation used to group packets together that have the same network source/destination and a similar class of service. An individual egress connection queue 113 associated with each of the "e" connections may also be provided. System cells may arrive at egress content processor 20*n* via egress content processor link 19*n*. The system cell header of each system cell may then be forwarded to system cell header lookup 108. Based on information that is contained within the system cell header, the non-header bytes of the system cell may be forwarded to the correct egress connection queue 113. Complete packets may then be read from the egress connection queues 113 according to output queue selector 114 in order to generate the packet formatted output stream containing "e" number of connections.

Output queue selector 114 may make its selection based on cell arrival information and/or software programmable connection configuration information. Egress connection queues 113 are provided at egress content processor 20*n* in order to reassemble complete packets. In addition, such egress connection queues 113 are provided for the case where: 1) the maximum possible cell arrival rate on egress content processor link 19*n* is greater than the maximum possible corresponding packet departure rate on the packet formatted output stream, and/or 2) the packet formatted output stream feeds multiple lower rate physical interfaces. Information in egress connection queues 113 may be properly forwarded to multiplexer 112 and then suitably formatted where appropriate such that the information is communicated to egress physical layer processor 22*n* in a packet formatted output stream of information.

FIG. 8 is a block diagram of an example stream format 120 for either ingress content processor links 17*a-n* or egress content processor links 19*a-n* in accordance with one embodiment of the present invention. The content processor link (both ingress and egress where appropriate) may be formatted as a link that includes a non-interrupted stream of system cell slots 122a-p. Furthermore, the link may be formatted such that an integer number of system cell slots 122a-p are included within a period that spans a given SONET frame time interval, such as 125 microseconds for example.

Assuming for purposes of teaching that: 1) a system cell has a size of 64 bytes, 2) each content processor provided in communication system 10 is capable of processing a payload associated with one OC-48 SONET signal, and 3) the smallest supported TDM channel size (i.e., TDM connection size) is equal to a single STS-1 payload, the content processor link rate can be calculated from the following equation (identified as Equation 1).

$$\text{Link Bit Rate} = (w*q/v)*r = (48*64/v)*51.84*10^6 \quad \text{Equation 1:}$$

where:
w=number of connections supported per link, plus the number of overhead slots per group of connections.
q=system cell size (in bytes)
v=number of non-overhead bytes in a system cell
r=rate associated with the minimum connection size Assuming that 10 out of 64 bytes are dedicated to cell overhead (i.e., v=54), and assuming no "overhead" slots (i.e., extra slots), the link rate for this example is equal to 2.94912 Giga-bits per second (Gbps).

Given that each system cell contains 512 bits in an example embodiment (64×8), the cell rate for this example link is equal to $5.76 \times 10^6$ system cells per second ($2.94912 \times 10^9/512$), and the number of system cells per SONET frame may be calculated from the following equation (identified as Equation 2).

$$\text{Number of System Cells per SONET Frame} = \text{Frame Period/Cell Period} = 125*10^{-6}/(1/5.76*10^6) = 720 \quad \text{Equation 2:}$$

From Equation 2 it may be observed that, for this non-limiting example, there are 720 system cell slots per SONET frame. Because there are 48 channels (STS-1 level connections) per SONET frame, there may be 15 system cells per STS-1 connection per SONET frame period. Given that each STS-1 within a given SONET frame occupies 810 bytes, and provided each of the system cells is capable of carrying 54 SONET bytes, it may be observed that 15 system cells are able to transport all 810 bytes associated with a STS-1 signal (i.e., 15×54=810).

Where such a link is generated by a STS-48 level (TDM type) ingress content processor (such as ingress content processor 16a for example), then c=48, and the ingress content processor link 17a may contain a continuous cell stream pattern that repeats every forty-eight system cell slot time periods. This example embodiment is reflected in FIG. 9. In general, the rate of the content processor link may be set such that all TDM connections may be transported with an integer number of system cells per SONET frame period.

It is important to note that although the system cells have been described with reference to specific sizes in FIGS. 8 and 9, the system cells may be of any suitable length and formatted in any appropriate manner. In addition, all system cells contain the same number of bytes (i.e., TDM, ATM, and IP packet carrying system cells all contain the same number of bytes of data). In an ATM context, though not necessary, the system cell size should generally be large enough to hold one complete ATM cell, plus adequate system cell overhead. An additional number of system cells (per 125 microseconds) may also be added to the content processor link (w>48 in Equation 1 for the example link) in order to accommodate the bandwidth expansion that is associated with the segmentation process of converting variable length packets to fixed system cells.

FIGS. 10A-D are a simplified block diagrams of an example switch fabric 12. Switch fabric 12 may include a bandwidth scheduler 140, and an M×M switch 141, an output switch group 1 element 142 that includes a cell router 160, a stage 2 queue group 1 element 162, and a stage 2 queue group K element 164. Additionally, switch fabric 12 may include an output switch group 2 element 144, an output switch group M element 146, and multiplexers 148a-n. M×M switch 141 includes cell router 150, a stage 1 queue group 1 element 152, a stage 1 queue group 2 element 154, and a stage 1 queue group M element 156. These additional elements may cooperate in order to facilitate the transmission, reception, processing, or communication of data or information in a network environment. Where appropriate, theses elements may be modified or positioned in other suitable locations in order to facilitate the processing of various types of communications protocols.

In order to accommodate its physical construction, N by N switch fabric 12 may include one or more stages of queuing (as shown for example in FIGS. 10A-D). System cells of all types may be forwarded through a common queuing structure (queue group) within at least one stage of queuing. Two stages of queuing may be provided for switch fabric 12, whereby during stage 1 system cells of all types (TDM, ATM, and IP packet) may be forwarded through common queuing structures. During stage 2, each queuing structure may be dedicated to a specific system cell type. As an example, all cells that are destined for the egress content processors 20a-n that are attached to output switch group 1 element 142 will flow through stage 1 queue group 1 element 152.

Ingress and egress content processor links 17a-n and 19a-n may be arranged in groups of K such that there are a total of M groups. Assuming that each ingress content processor link 17a-n operates with a link rate equal to R, each of the K links within a given ingress group may be multiplexed to a link rate equal to K×R. This may be done using a simple cell division multiplexing technique. For example, if K=3 then the multiplexed link is formed by placing a system cell from each of the three input links onto the higher rate link once every content processor link cell period. This may assume that the cell boundaries are aligned with one another on each of the K links associated with a group prior to being multiplexed. The multiplexed links may be referred to as high-rate links (ingress and egress) and the cell period associated with these links may be referred to as high-rate link cell periods. It should be noted that the content processors that are associated with a given group of content processor links do not have to be of the same type. Any combination or mixture of content processors may be permitted within a given multiplexed group. It should also noted that cell headers do not necessarily have to be examined during the multiplexing process. Cell header evaluations may occur at any suitable time interval in any appropriate location within communication system 10. In other scenarios, cell header information and look up operations may be avoided entirely.

Following the multiplexing process, the M high-rate links may be forwarded to M×M switch 141 where cell router 150 may be used to forward system cells to appropriate stage 1 queue groups 152, 154, 156. The system cell streams of all M high-rate links may be first aligned with one another at the input of M×M switch 141. This may be followed by an operation during each high-rate link system cell slot period where the headers of M system cells are examined in order to determine to which stage 1 queue group the system cells should be forwarded.

Cell router 150 within switch fabric 12 may be constructed such that it is able to effectively deliver all M arriving system cells to their appropriate stage 1 queue group for each high-rate cell slot period. This may be true regardless of the number of arriving system cells that are destined for a common stage 1 queue group. For example, if M system cells simultaneously arrive at M×M switch 141 and all these system cells are destined for stage 1 queue group 2 element 154, then (assuming that there is space available in queue group 2 element 154) all M system cells will be written to stage 1 queue group 2 element 154. Similarly, if M system cells simultaneously arrive at switch fabric 141 and each of the M system cells are to be broadcasted to all M stage 1 queue groups (i.e., M number of 1-to-M point-to-multipoint system cells), then cell router 150 is able to forward all copies of all system cells to all stage 1 queue groups. This results in storing $M^2$ system cells in the stage 1 queue groups during a single high-rate link cell period.

Associated with each stage 1 queue groups 152, 154, 156 are two or more priority queues as illustrated in FIGS. 10A-D. When a system cell arrives at the input of stage 1 queue group 1 element 152 for example, the cell header may be examined in order to determine which priority queue within the queue group the system cell should be written into. In addition, idle type system cells may be discarded upon reaching switch fabric 141. In an example communication, the TDM carrying system cells may be written into a highest priority queue, while the ATM and IP packet carrying system cells may be written into lower priority queues. Where appropriate, the ATM and IP packet carrying system cells may be written into the same priority queue within a given stage 1 queue group.

System cells may be read out of each stage 1 queue group at the egress high-rate link rate. (Where the egress high-rate link rate may be greater than the ingress high-rate link rate.) Within a given stage 1 queue group, a system cell from a given priority queue may be read if the next higher priority queue is empty (this may be referred to as strict priority de-queuing). For example, in a system that contains two priority queues per stage 1 queue group, the lower priority queue (which may contain ATM and IP packet carrying system cells) may only be read if the higher priority queue (which may contain TDM carrying system cells) is empty. This may translate to a delay and delay variation associated with any given TDM carrying system cell that is not affected by the presence of any ATM or IP packet carrying system cells within switch fabric 12. Thus, TDM carrying system cells are affected only by the presence of other TDM carrying system cells. Because the number of TDM connections are bounded and the cell rates associated with all TDM connections are fixed, the maximum queue size (i.e., queue depth) associated with the highest priority queue within the stage 1 queue group is bounded and sufficiently accommodated.

After exiting a given stage 1 queue group 152, 154, 156, system cells may be forwarded to the corresponding output switch group element 142, 144, and 146. After arriving at a given output switch group 142, the system cell headers of each system cell may be examined in order to determine the stage 2 queue group 162 or 164 to which each system cell should be forwarded. Cell router 160 within a given output switch group 142 may be able to simultaneously forward a given system cell to all K stage 2 queue groups and multicast data or information where appropriate. Thus, during each egress high-rate link cell period, K system cells may be written into the total volume associated with all stage 2 queue groups 162 and 164.

Associated with each stage 2 queue group 162 and 164 may be two or more priority queues. When a system cell arrives at the input of a given stage 2 queue group, the cell header may be examined again in order to determine which priority queue within the queue group the cell should be written into. For the case where a TDM egress content processor 20a is attached to a stage 2 queue group, a single priority queue may be used for the TDM carrying system cells and, therefore, all TDM carrying system cells may be written to the same priority queue. It should be noted, however, that if extra system cell slots are provided on the internal system links (e.g., w in Equation 1 is greater than 48 for the case of an STS-48 TDM content processor 16a, system control cells from ingress TDM content processors 16a may utilize lower priority queues within the stage 2 queue group. A system control cell is a cell whose data content does not originate from the inputs of the physical layer processors. In such a case, if the cells are de-queued using strict priority de-queuing, the presence of system control cells will not effect the cell delay and cell delay variation of the TDM carrying system cells. As was the case of the stage 1 queues, for the TDM case the stage 2 maximum queue size may be bounded and accordingly calculated and adequately accommodated.

For the case where either an ATM or IP packet content processor is attached to a stage 2 queue group, multiple priority queues may be utilized. For example, system cells of connections that may require a lower transfer delay may be assigned to a high priority queue while the system cells of those connections that have less strict transfer delay requirements may be assigned to a lower priority queue. A strict priority de-queuing mechanism may be used to serve the queues associated with the stage 2 queue groups but other suitable mechanisms are also possible in accordance with particular needs.

FIG. 11 is a block diagram of an example stream format 170. FIG. 11 provides an example format that may be used in order to more clearly understand the queuing dynamics associated with TDM carrying system cells that are prominent when TDM carrying system cells are mixed with ATM and IP packet carrying system cells within a common queue group. Stream format 170 may be structured as a link that includes a non-interrupted stream of system cell slots 172a-c that each represent a cell of STS-1 connections 1-3. Furthermore, the link may be formatted such that an integer number of system cell slots 172a-c are included within a period that spans a given SONET frame interval (such as 125 microseconds for example). Due to the construction of switch fabric 12 and the TDM content processors, there is no need to perform system wide scheduling of TDM connections.

Figure 12A:
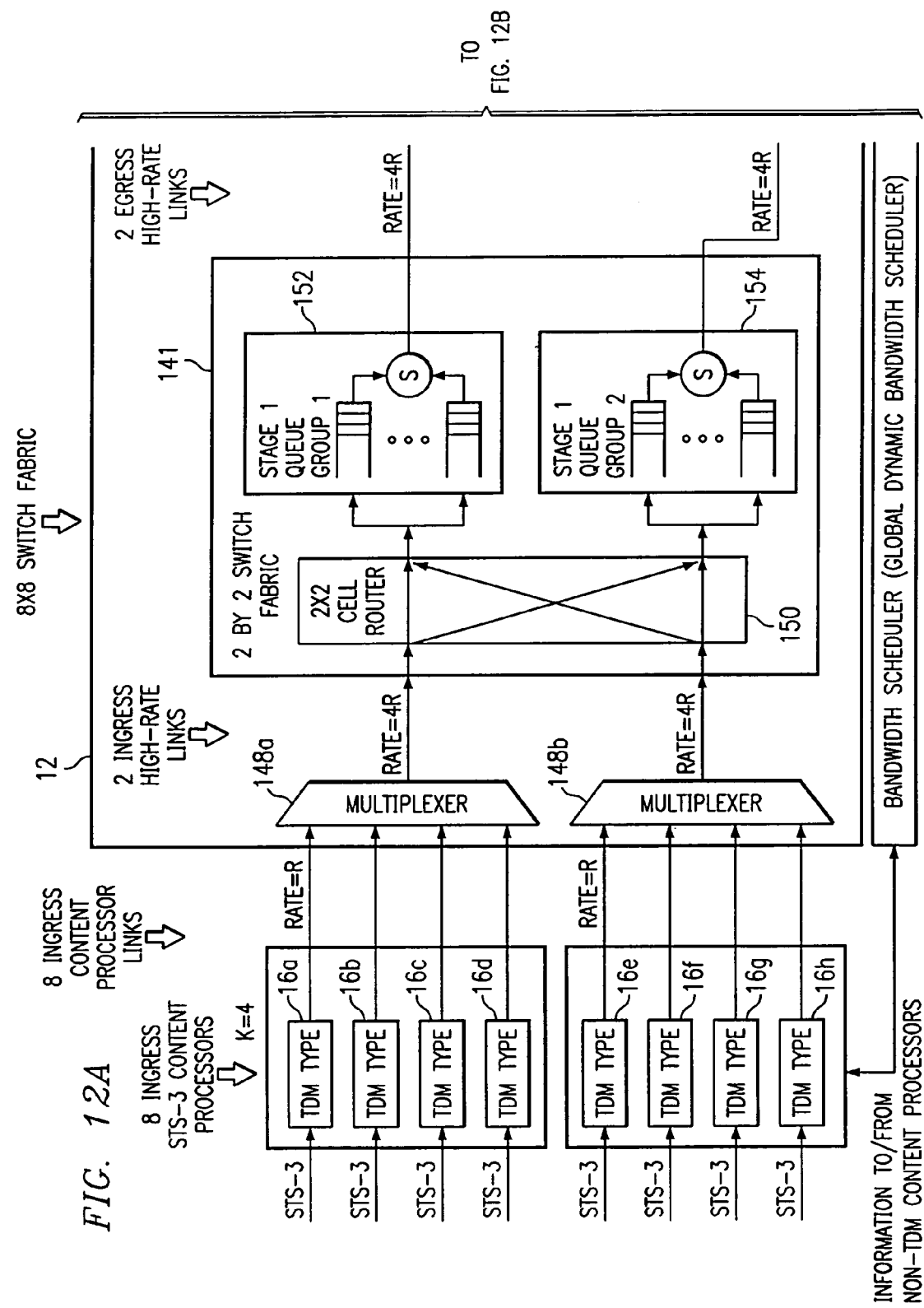
FIGS. 12A-B are a block diagram of a specific implementation of the communications system.
Figure 12B:
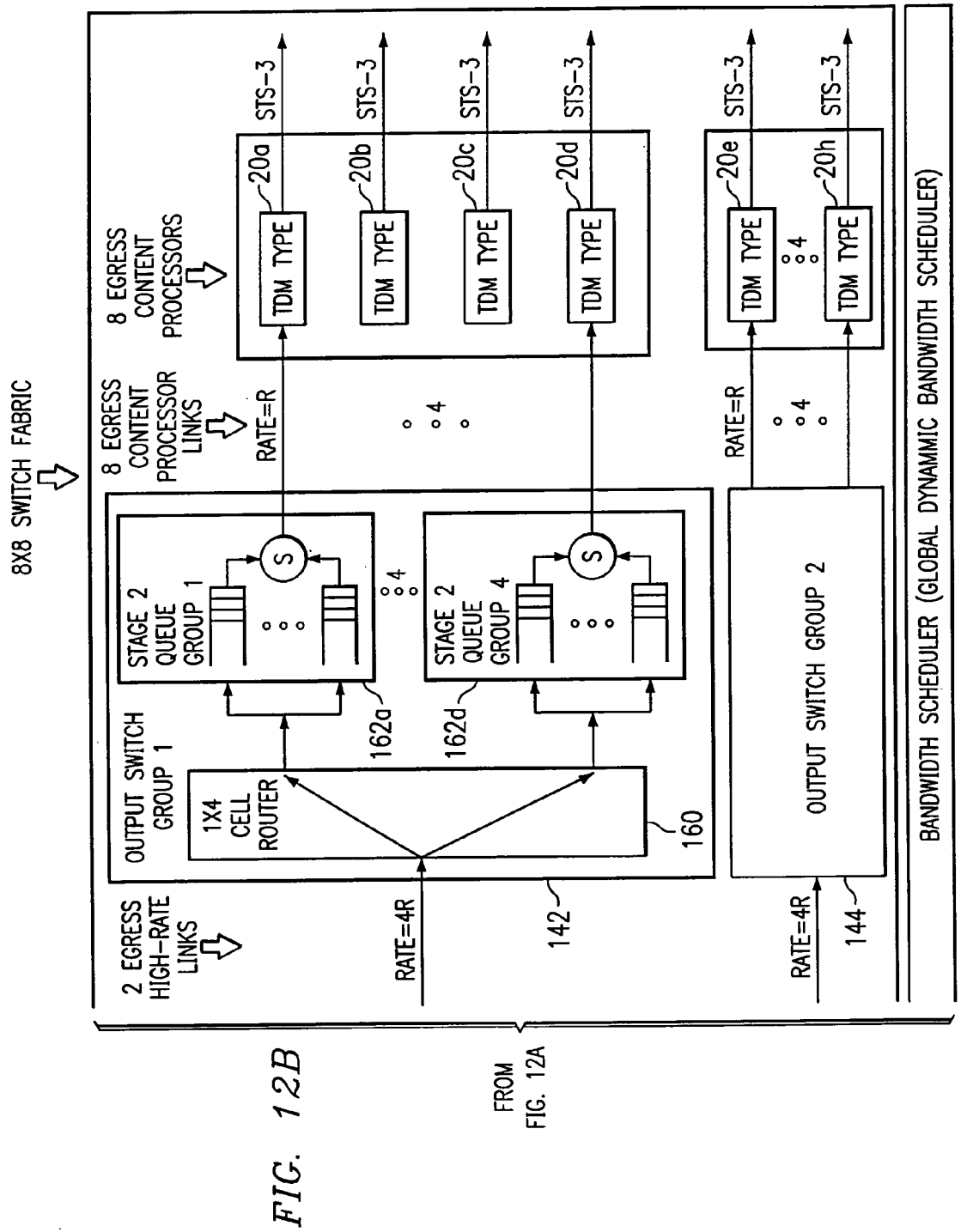

FIGS. 12A-B show an example of a specific implementation of communication system 10. For the specific implementation shown, communication system 10 has 8 ingress content processors 16a-h, 8 egress content processors 20a-h, an 8×8 switch fabric 12, two multiplexers 148a-b, two ingress and egress high-rate links, a 2×2 switch 141, a 2×2 cell router 150, two stage 1 queue groups 152 and 154, output switch group 1 element 142, and output switch group 2 element 144. Each output switch group element includes a 1×4 cell router 160 and four stage 2 queue groups 162a-d.

With reference to FIGS. 12A-B, stream format 170 may be associated with eight STS-3 level TDM content processors and an 8 by 8 switch fabric (N=8) that includes two stages of queuing. Four content processor links may be grouped in order to form a high-rate link operating at four times the rate of an individual content processor link (i.e., K=4). Since there are no ATM or IP packet content processors, the highest priority queue may be used in each queue group. Assuming a system cell size of 64 bytes (with 10 overhead bytes) a content processor link rate of 184.32 Mega-bits per second (Mbps) may be calculated from Equation 1 (i.e., R=184.32 Mbps). This is equivalent to a cell rate of 360,000 cells per second. From Equation 2 it is noted that there are 45 system cells per 125 microseconds or 15 system cells of a given STS-1 per 125 microseconds. Because each high-rate link rate is equal to four times the content processor link rate, the high-rate link rate is equal to 737.28 Mbps and the corresponding cell rate is equal to $1.44 \times 10^6$ cells/sec.

Figure 13:
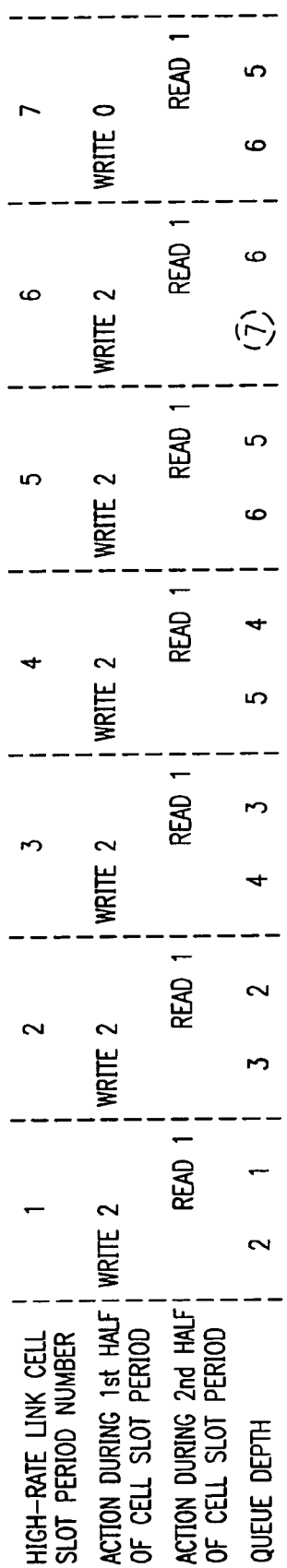
FIG. 13 is a chart illustrating an example calculation that reflects a queue size utilized in communicating data through the switch fabric.

FIG. 13 is a chart illustrating an example calculation that reflects a queue size utilized in communicating data. In order to determine the maximum queue depths in switch fabric 12, a worst case communication scenario may be constructed. In general, the maximum queue depth of the highest priority queue within a stage 1 queue group (the TDM priority queue) for example occurs when all the system cells that flow through the queue arrive at switch fabric 12 in the maximum possible burst. The number of individual TDM connections that flow through a given stage 1 priority queue represents an absolute upper bound of the queue depth. This queue depth can only be achieved if a cell from each connection can simultaneously be delivered to the queue.

In FIGS. 12A-B, the bandwidth of the high-rate link exiting a given stage 1 queue group may support twelve individual STS-1 connections (4×3), and therefore the upper bound on the maximum queue depth for the high priority queue is twelve cells. It may be noted that only two cells may be delivered to a given stage 1 queue group during each high-rate link cell slot period (one from each ingress high-rate link). Thus, the shortest amount of time it takes to deliver twelve cells to a given stage 1 queue in FIGS. 12A-B is six high-rate link system cell slot periods. However, beginning with the high-rate link cell slot period when the first two system cells of the "burst" are written into the queue, one system cell may be drained from the queue during every high-rate link cell slot period to produce a maximum stage 1 high priority queue depth of seven (as shown in FIG. 13). It should be noted that in this worst case burst example there are six consecutive highrate link cell slot periods where no system cells (zero) are delivered to the TDM priority queue. This allows the queue to empty before the next burst of twelve cells arrive.

The maximum depth of the stage 2 high priority queue may be calculated in a manner similar to the way the stage 1 high priority queue depth is calculated. Referring to FIGS. 12A-B, the maximum number of STS-1 level TDM connections that may pass through a given stage 2 high priority queue is equal to three. Therefore, the maximum queue depth is achieved when all three cells arrive consecutively on the egress high-rate link. For this case, three cells are written to the queue in three high-rate link cell slot periods. This time is less than one egress content processor link cell slot period. Because the queue is drained at a quarter of the queue fill rate, it may be possible for the stage 2 high priority queue depth to reach three cells, in the example system of FIGS. 12A-B.

Once the maximum TDM priority queue depths are calculated, the maximum delay of a TDM carrying system cell through switch fabric 12 may be calculated. The worst case switch fabric 12 delay occurs when a given system cell experiences the worst case delay through both the stage 1 and stage 2 queue groups. This occurs when a given system cell is the last cell in the maximum burst to the stage 1 queue and is then the last system cell in the maximum burst to the stage 2 queue. In the example provided in FIG. 13, the last system cell of the TDM burst is written into the TDM stage 1 priority queue during the high-rate link period number six. This system cell is read out of the stage 1 queue six high-rate link cell periods after being written and, therefore, experience a delay equal to six high-rate link cell periods or approximately 4.17 microseconds (6×694.4 ns).

If it is assumed that the second and third to last system cells (of the twelve system cell burst) are destined for the same stage 2 queue as the last system cell of the burst, then a three system cell burst may be delivered to the stage 2 queue. Because the last system cell may have to wait in the stage 2 queue until the second and third to last system cells are drained, the last system cell may experience a two content processor link cell period delay through the stage 2 queue or approximately 5.56 microseconds (2×2.78 microseconds). Thus, the total worst case delay experienced by a TDM carrying system cell is equal to the sum of the worst case delays through the stage 1 and stage 2 queues or 9.73 microseconds in the example embodiment described by FIGS. 12A-B.

Figure 14:
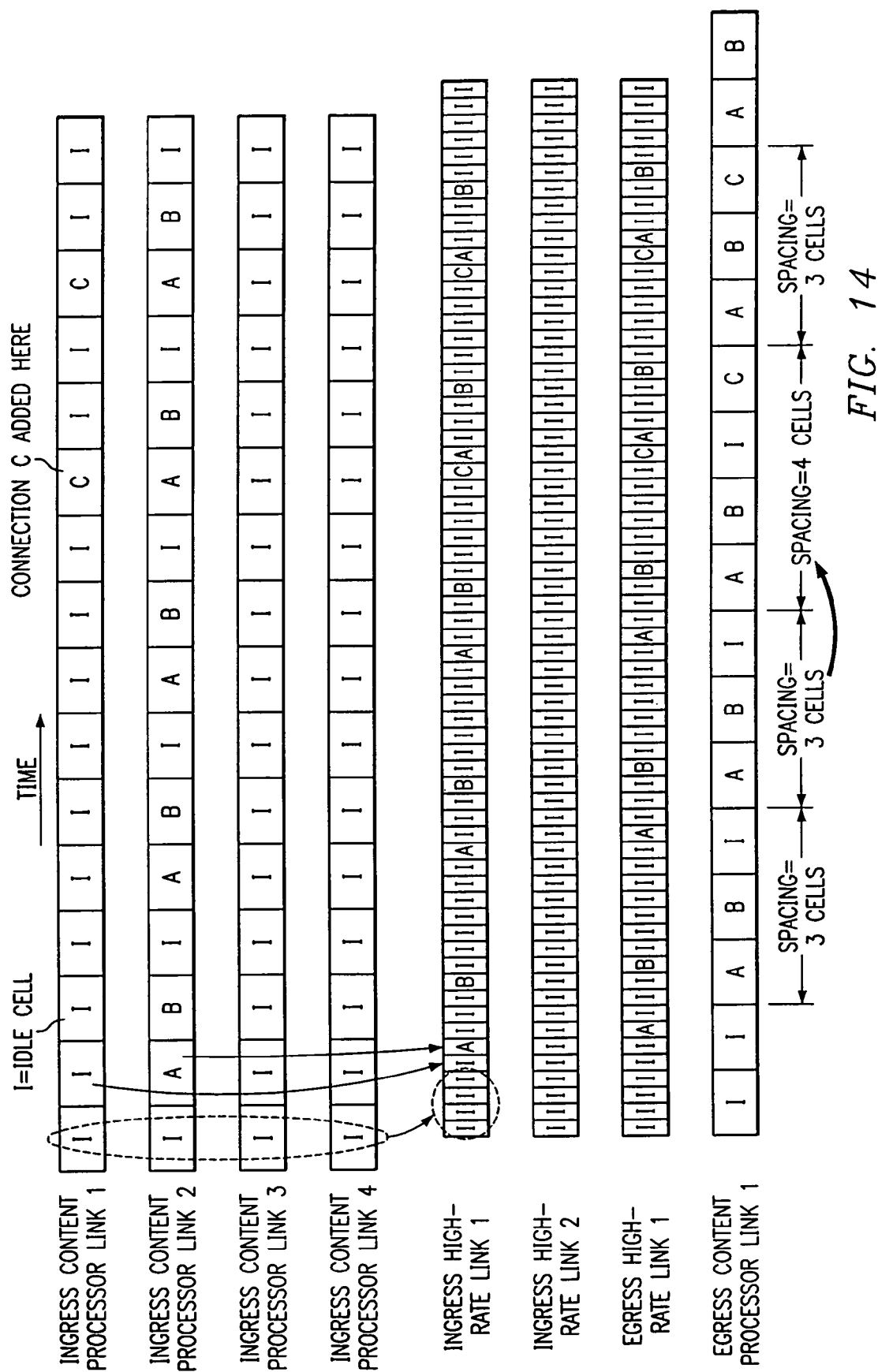
FIG. 14 is a chart illustrating an example formatting for multiple processor links associated with the switch fabric.

FIG. 14 is a chart illustrating an example format for multiple processor links. FIG. 14 may also be used to explain management and supervision of system cell traffic. FIG. 14 is based upon the example implementation shown in FIGS. 12A-B. In FIGS. 12A-B, four ingress content processor links are multiplexed into one ingress high-rate link. In FIG. 14, the corresponding four ingress content processor links are labeled INGRESS CONTENT PROCESSOR LINKs 1 through 4, and the corresponding ingress high-rate link is labeled INGRESS HIGH-RATE LINK 1. INGRESS HIGH-RATE LINK 1 and INGRESS HIGH-RATE LINK 2 (which contains all idle cells) are forwarded to the 2×2 cell router in FIG. 12A, and the non-idle cells are all directed to the highest priority queue of stage 1 queue group 1, where they are stored. The stored cells are then read out of the stage 1 queue group, and forwarded to output switch group 1 via the egress high-rate link leaving the stage 1 queue group. This egress high-rate link is labeled EGRESS HIGH-RATE LINK 1 in FIG. 14. The non-idle cells that are transported on EGRESS HIGH-RATE LINK 1 are all stored in the highest priority queue of stage 2 queue group 1 of FIG. 12B. These cells are then read out of the stage 2 queue and forwarded to egress content processor 1 via the signal that is labeled EGRESS CONTENT PROCESSOR LINK 1 in FIG. 14. The operations shown in FIG. 14 are discussed further in the following paragraphs.

One of the purposes of the egress connection queues within the egress content processor is to allow the bytes of a given TDM connection to be forwarded out of the system in a smooth and continuous manner (i.e., periodic). The TDM bytes of a given connection are forwarded out of the system in a periodic fashion despite the fact that the bytes of a given connection arrive at the egress content processor in bursts of fifty-four bytes for example. In order to perform this smoothing process, each TDM egress connection queue is pre-charged. Thus, some amount of TDM cell bytes may first be initially accumulated within the egress connection queue before any bytes are drained from the egress connection queue.

In the absence of system level TDM connection additions or deletions (and in the absence of system cell loss), the system cells of a given TDM connection arrive at the egress content processor in a periodic manner. However, when new connections are added, or when existing connections are deleted, the periodic arrival of system cells at the egress content processor may be disrupted. For instance, when a new connection is added to the system, the cells of this new connection may arrive at the switch fabric in such a manner as to cause the cells of some existing connections to be delayed within the queues of the fabric. If the egress connection queues of TDM connections are not properly pre-charged, then the delay of system cells due to the establishment of new connections could cause the egress TDM connection queues of those effected connections to underflow. When a TDM egress connection queue underflows, the bytes of its associated TDM connection will no longer be forwarded out of the system in a smooth and continuous manner.

In order to further illustrate this point, with respect to FIGS. 12A-B, assume two STS-1 level connections between one ingress content processor and one egress content processor are established and it is desired to add a third connection. Assume further that the third connection is between a different ingress content processor and the same egress content processor that terminates the two existing connections. The effect of adding the third connection on the two existing connections is illustrated in FIG. 14. In this example, connections "A" and "B" represent existing connections, and connection "C" represents a later-added connection. The addition of connection "C" has the effect of delaying the system cell streams associated with connections "A" and "B." Once the phase shift of the system "A" and "B" cell streams occurs, the cell spacing of these connections return to their normal cell spacing on the egress content processor link.

In a worst case scenario, a connection may be added to the system such that its corresponding system cells initially experience the minimal delay through switch fabric 12. Connections may then be added in such a way that the system cells of the initial connection experience the maximum delay through the system. In order to be able to read TDM bytes in a periodic manner, the TDM egress connection queue may absorb the maximum delay (equal to the difference between minimum and maximum delays through switch fabric 12). Therefore, it may be observed that a given TDM egress connection queue may be pre-charged such that once the first byte of the first system cell is written to the egress connection queue, an additional time interval may be sustained before beginning to read bytes out of the connection queue. This additional time may be equal to the difference between the maximum and minimum fabric cell delay times.

In another example worst case scenario, a connection may be added to the system such that its corresponding system cells initially experience a maximum delay through switch fabric 12. Connections may then be deleted in such a way that the system cells of the initial connection experience a minimal delay through the system. Thus, it may be observed that a given TDM egress connection queue may be large enough such that, once it is pre-charged, it may accommodate an additional amount of TDM bytes equal to the number of bytes that could be received over the period of time equal to the difference between the maximum and minimum fabric cell delay times.

For a given switch fabric 12 type/size, the TDM egress connection queues may be pre-charged such that the egress connection queues neither overflow nor underflow while minimizing the maximum delay that system cells experience when flowing through one or more egress connection queues. For example, an arbitrarily large egress connection queue that is pre-charged to half its total depth may cause TDM system cells to experience a high system delay. A TDM egress connection queue that is large, but can be programmed to be pre-charged by any arbitrary amount, may be utilized with switch fabrics of differing maximum fabric delays. This may allow switch fabric 12 to be upgraded within a system without having to replace TDM content processors while also allowing the delay through the egress connection queues to be optimized for both the existing and new switch fabrics.

It is important to note that there are four aspects of communication system 10 that allow point to point TDM connections to be established without the use of a bandwidth scheduler. The first aspect relates to the self-routing feature of communication system 10. In order to have a TDM system cell routed to the correct destination, it is only necessary to correctly program the system cell header at a given TDM ingress content processor. Each portion of switch fabric 12 may utilize this header information to automatically route a given cell to its proper egress connection queue(s). The second aspect relates to the use of priority de-queuing within the stage 1 queue groups. Utilizing priority within the stage 1 queue group may prevent ATM and IP packet carrying system cells from affecting the cell delay and cell delay variation of TDM connections. The third aspect relates to the proper sizing of the TDM priority queues within switch fabric 12. By sizing the TDM priority queues large enough to accommodate worst case connection scenarios (i.e., sufficient enough to accommodate worst case TDM bursts), system cells of a given connection may be delivered to switch fabric 12 without any knowledge of the timing relationships of when the system cells of other connections may be delivered to switch fabric 12. The fourth aspect relates to the use, proper sizing, and proper pre-charge operation of the TDM egress connection queues on the egress TDM content processors. These egress connection queues may allow new connections to be added and/or existing connections to be deleted without affecting any remaining existing connections. Thus, in order to establish a point to point TDM connection, it is only required to ascertain whether or not both the ingress and egress facilities contain enough available bandwidth to support the connection. Global resources do not need to be secured or manipulated.

Figure 15:
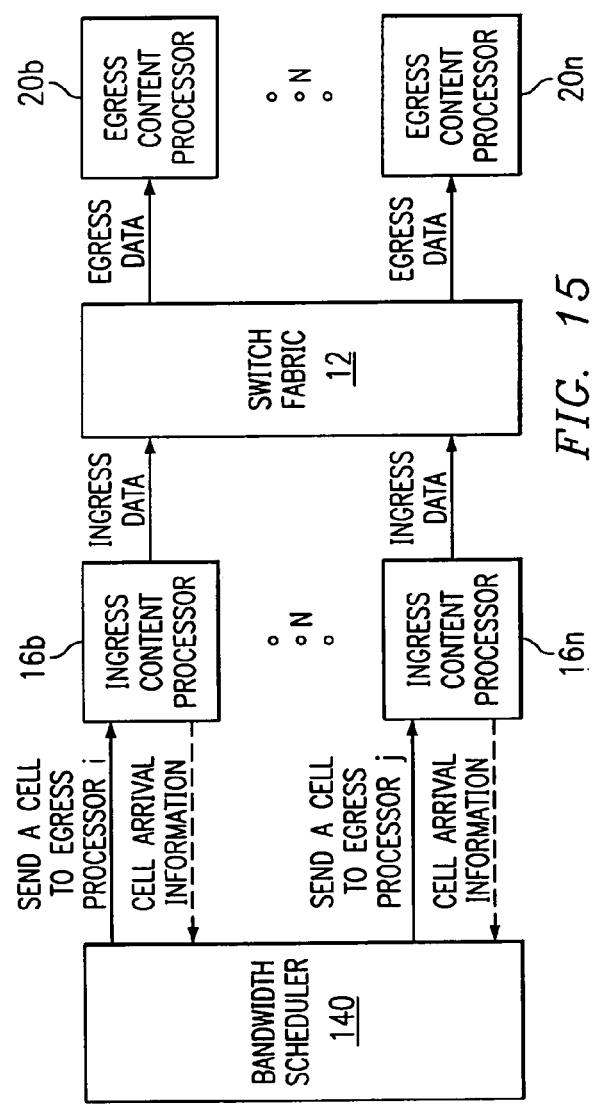
FIG. 15 is a block diagram of a bandwidth scheduler included within the communications system.

FIG. 15 is a block diagram of bandwidth scheduler 140 included within switch fabric 12 of communication system 10 in accordance with one embodiment of the present invention. Bandwidth scheduler 140 may be an ATM/packet global dynamic bandwidth scheduler that is used to allow (or conversely, not allow) system cells into switch fabric 12. All types of ingress content processors (e.g., TDM, ATM, and IP packet) may include ingress connection queues that are used to hold system cells prior to being forwarded to switch fabric 12. However, in the case of the TDM ingress content processor, there is no global gate keeper that prevents the TDM carrying system cells from entering switch fabric 12. Nor may there be any tables that need to be programmed within switch fabric 12 in order to support point to point TDM connections.

Each TDM ingress content processor 16a may forward a given TDM carrying system cell whenever such a system cell becomes available. This is not the case for the ATM and IP packet ingress content processors (i.e., non-TDM ingress content processors). For the non-TDM content processors, a gate keeper element may be provided that selectively allows ATM and/or IP packet carrying system cells into switch fabric 12. There may be several reasons for this. First, although ATM/IP packet carrying cells are queued separately from TDM carrying system cells, it is assumed that the amount of cell storage space within switch fabric 12 for ATM/IP packet carrying system cells is limited. Second, there are potentially a much larger number of ATM/IP packet type connections possible when compared to a system consisting entirely of TDM type connections (because the size of the individual connections can be much smaller than an STS-1). Therefore, no upper bound on the size of the switch fabric queues can be easily determined. Third, the ATM cells/IP packets associated with many types of ATM/IP packet connections may arrive in bursts (unlike the general periodic nature of TDM traffic).

The role of bandwidth scheduler 140 may be to dynamically allocate both ingress and egress content processor link bandwidth to the connections associated with the ATM and IP packet content processors. This may be effectuated, for example, by globally examining the bandwidth needs of all ingress ATM/IP packet content processors in the system on a continuous basis. The highest level of fairness (and the highest level of link utilization) may be obtained by having the ability to assign input queued system cells to egress content processor link system cell slots on a system cell by system cell basis. Such a system, on every given system cell slot period, may simultaneously examine the queued system cells at each ingress content processor and then make one system cell assignment to each of the N egress content processor links.

In operation of the specific implementation shown in FIGS. 12A-B, bandwidth scheduler 140 allocates bandwidth to designated elements in the following manner. A notification may be sent to bandwidth scheduler 140 whenever a system cell worth of data is queued at a given non-TDM ingress content processor. Therefore, bandwidth scheduler 140 may have knowledge of all system cells that are queued at all non-TDM ingress content system processors. With this knowledge, during each content processor cell slot period, bandwidth scheduler 140 may grant a system cell slot worth of bandwidth on an egress content processor link (where appropriate). This may be accomplished by sending a grant to up to N non-TDM ingress content processors. A given grant may indicate to which egress content processor that a given ingress content processor communicates. Since communication system 10 may include a combination of TDM and non-TDM content processors, bandwidth scheduler 140 may be told which ingress and egress content processor links carry non-TDM system cells. Bandwidth scheduler 140 may accept cell arrival information from non-TDM ingress content processors and send grants to non-TDM ingress content processors where appropriate.

If bandwidth scheduler 140 allows one system cell to be sent to any given non-TDM egress content processor every content processor link system cell slot period, then the queue depth of the non-TDM priority queue within the stage 1 queue group is bounded. For example, assume that there are three ATM content processors and one TDM content processor attached to output switch group 1 in the system of FIGS. 12A-B. For this case, during any given content processor link system cell slot period, a maximum of three ATM carrying system cells (which are destined for the three non-TDM egress content processors) may be allowed to be sent to switch fabric 12. The worst case ATM carrying system cell buffering scenario occurs when three TDM carrying system cells arrive at switch fabric 12 in a burst during the time when a burst of three ATM carrying system cells (destined for the same output switch group) also arrive at switch fabric 12. For such a case, because the three TDM carrying system cells are de-queued first, some fixed amount of ATM carrying system cells may get congested in the non-TDM priority queue within the stage 1 queue group. Since the number of arriving ATM carrying system cells is controlled by bandwidth scheduler 140, the maximum queue depth of the non-TDM stage priority queue is bounded, and can be calculated. Bandwidth scheduler 140 may be used to address this issue by precisely bounding the maximum cell depth of the non-TDM priority queues within the stage 1 queue groups.

Instead of only allowing one system cell to be sent to a non-TDM egress content processor every content processor link system cell slot period, two or more system cells may be sent to allow any resulting system cell bursts to be buffered within the stage 1 and stage 2 queues. More than one system cell may be forwarded to a given egress content processor during a given system cell period if during future system cell slot periods no system cells are forwarded to the egress content processor. By monitoring the number of system cells that are sent to each egress content processor every system cell slot period, bandwidth scheduler 140 may precisely control the internal queue depths within switch fabric 12. Alternatively, the egress high-rate links may be sped up in order to drain the stage 1 queues more quickly. Bandwidth scheduler 140 may use the knowledge of a speedup factor on the egress high-rate links in order to obtain higher throughputs with respect to the stage 1 queues.

Two elements may affect the delay of the ATM and IP packet carrying system cells of a given connection through the switch fabric 12. They are: 1) the presence of TDM carrying system cells in switch fabric 12, and 2) the presence of system cells from other non-TDM connections in switch fabric 12. Because the number of TDM connections that are transported through a given stage 1 queue group is generally known, a calculation may be made that produces the maximum delay through the stage 1 queue group which ATM and IP packet carrying system cells may experience due to TDM connections.

FIG. 16 is a flowchart illustrating a series of example steps associated with a method for communicating data using switch fabric 12 included within communication system 10. The flowchart begins at step 100 where an input signal is received at a selected physical layer processor. The input signal may be in any suitable format, such as ATM, TDM, or IP packet. At step 102, the input signal may be processed by the selected physical layer processor such that physical layer protocols are accounted for and data is properly formatted. The data may then be communicated to a corresponding content processor. The common format between a physical layer processor and the content processor may be SONET/SDH based or any other protocol in accordance with particular needs.

At step 104, the content processor may receive the data, perform an application specific function, and then forward the data to a common switch fabric 12 shared by one or more content processors. At step 106, switch fabric 12 may receive the data and forward the information to an egress content processor according to particular routing needs. Switch fabric 12 may include one or more queue stages and a cell router operable to facilitate this process. At step 108, an egress content processor may perform a cell header lookup operation in determining how to direct the data to be communicated to a corresponding physical layer processor.

At step 110, the physical layer processor may receive the data and then forward it to an appropriate next destination. The physical layer processor may perform one or more processing operations based on physical layer protocols or formatting requirements of one or more elements downstream of the physical layer processor.

Some of the steps illustrated in FIG. 16 may be changed or deleted where appropriate and additional steps may also be added to the flowchart. These changes may be based on specific communication system architectures or particular networking arrangements or configurations and do not depart from the scope or the teachings of the present invention.

In summary, an approach for communicating data is provided that offers the ability to accommodate numerous communications protocols adequately with a single switch fabric. This is a result of multiple content processors that may suitably process incoming data such that the switch fabric may direct the incoming data to a proper next destination. The switch fabric architecture may ensure that high operational speeds are maintained during such processing. The switch fabric may further minimize system overflows as information is properly managed or directed to specific elements capable of processing the particular comminations protocol. Bottlenecks that are produced by system overflows are effectively avoided as bandwidth allocations for a corresponding communications architecture are maintained at optimal levels. The communication system provided allows for increased stability and enhanced communications of data propagating through the switch fabric. The buffers or data cells in a corresponding set of queues may be protected from overflow. Additionally, one or more memory elements within the switch fabric may be properly utilized such that additional memory elements are not required. This may be significant in cases where the memory elements or storage units present a significant expense to a system designer or occupy valuable space within an integrated circuit. The switch fabric accounts for the various types of data propagating within the system. The switch fabric combines the functionality of multiple network elements, such as an asynchronous transfer mode (ATM) switch, an internet protocol (IP) router, and a digital cross-connect system, into a single network unit. This may allow a network to transition from a time division multiplex (TDM) circuit switched-based format to a cell and/or packet-based format while utilizing a single network element. This offers flexibility to a corresponding network as any communications protocol may be adequately processed without significantly inhibiting networking speeds.

Although the present invention has been described in detail with reference to particular embodiments, it should be understood that various other changes, substitutions, and alterations may be made hereto without departing from the spirit and scope of the present invention. For example, although the present invention has been described with reference to a number of potentially suitable components that facilitate the processing of information in various types of formats, any suitable objects, elements, hardware, or software may be used in the applications or operations described above. The arrangements described above in conjunction with communication system 10 provide only an example configuration used for purposes of teaching, whereby numerous substitutions and modification may be made where appropriate and according to particular needs.

In addition, although communication system 10 has been described as operating in a particular environment, the present invention may be used in any suitable environment or application that seeks to receive, transmit, or communicate data or information. For example, communication system 10 may be used in conjunction with frame relay, X.25, or any other type of packet or circuit-switched applications. Moreover, switch fabric 12 may accommodate additional communications protocols such that a common interface is provided to a corresponding network.

Additionally, although FIGS. 1-15 have been described with reference to specific electronic elements in various configurations and formats, any suitable architecture may be provided in conjunction with an optical or electrical communication system 10 without departing from the scope of the present invention. Other appropriate networking components or suitable hardware and software may be provided within or external to communication system 10 in any appropriate arrangement. These alternative designs may be provided, designated, or otherwise selected in order to offer specific communications parameters that may in turn influence one or more properties associated with communication operations. For example, one or more elements within communication system 10 may change based on specific bandwidth requirements or constraints.

Numerous other changes, substitutions, variations, alterations, and modifications may be ascertained by those skilled in the art and it is intended that the present invention encompass all such changes, substitutions, variations, alterations, and modifications as falling within the spirit and scope of the appended claims. Moreover, the present invention is not intended to be limited in any way by any statement in the specification that is not otherwise reflected in the appended claims.

What is claimed is:

1. A system for forwarding information in a communications system, comprising:

a plurality of ingress content processors, each of the plurality of ingress content processors being associated with one of a plurality of traffic types, each ingress content processor operable to generate system cells carrying a payload associated with a respective one of the plurality of traffic types in response to receiving information in the respective one of the plurality of traffic types;

a switch fabric operable to receive a plurality of system cells from the plurality of ingress content processors, wherein system cells carrying payloads associated with a first one of the plurality of traffic types has a higher priority than system cells carrying payloads associated with other ones of the plurality of traffic types, the switch fabric operable to separately queue system cells carrying payloads associated with the first one of the plurality of traffic types from system cells carrying payloads associated with other ones of the plurality of traffic types, the switch fabric operable to service system cells carrying payloads associated with the first one of the plurality of traffic types prior to servicing system cells carrying payloads associated with other ones of the plurality of traffic types, wherein the plurality of ingress content processors associated with the first one of the plurality of traffic types automatically transports system cells carrying payloads associated with the first one of the plurality of traffic types to the switch fabric;

wherein ingress content processors associated with the first one of the plurality of traffic types forwards a system cell carrying payload information associated with the first one of the plurality of traffic types immediately upon generation;

wherein the plurality of ingress content processors associated with the other ones of the plurality of traffic types provide system cells to the switch fabric in response to scheduling information;

a bandwidth scheduler operable to generate the scheduling information to initiate transport of system cells carrying payloads associated with other ones of the plurality of traffic types;

wherein the bandwidth scheduler is operable to continuously examine bandwidth needs of ingress content processors associated with the other ones of the plurality of traffic types in order to dynamically allocate bandwidth for system cell transport in accordance with the scheduling information.

2. A system for forwarding information in a communications system, comprising:

a plurality of ingress content processors, each of the plurality of ingress content processors being associated with one of a plurality of traffic types, each ingress content processor operable to generate system cells carrying a payload associated with a respective one of the plurality of traffic types in response to receiving information in the respective one of the plurality of traffic types;

a switch fabric operable to receive a plurality of system cells from the plurality of ingress content processors, wherein system cells carrying payloads associated with a first one of the plurality of traffic types has a higher priority than system cells carrying payloads associated with other ones of the plurality of traffic types, the switch fabric operable to separately queue system cells carrying payloads associated with the first one of the plurality of traffic types from system cells carrying payloads associated with other ones of the plurality of traffic types, the switch fabric operable to service system cells carrying payloads associated with the first one of the plurality of traffic types prior to servicing system cells carrying payloads associated with other ones of the plurality of traffic types, wherein the plurality of ingress content processors associated with the first one of the plurality of traffic types automatically transports system cells carrying payloads associated with the first one of the plurality of traffic types to the switch fabric;

wherein ingress content processors associated with the first one of the plurality of traffic types forwards a system cell carrying payload information associated with the first one of the plurality of traffic types immediately upon generation;

wherein each ingress content processor is operable to insert idle system cells and control system cells in order to provide a continuous system cell stream to the switch fabric.

3. A system for forwarding information in a communications system, comprising:

a plurality of ingress content processors, each of the plurality of ingress content processors being associated with one of a plurality of traffic types, each ingress content processor operable to generate system cells carrying a payload associated with a respective one of the plurality of traffic types in response to receiving information in the respective one of the plurality of traffic types;

a switch fabric operable to receive a plurality of system cells from the plurality of ingress content processors, wherein system cells carrying payloads associated with a first one of the plurality of traffic types has a higher priority than system cells carrying payloads associated with other ones of the plurality of traffic types, the switch fabric operable to separately queue system cells carrying payloads associated with the first one of the plurality of traffic types from system cells carrying payloads associated with other ones of the plurality of traffic types, the switch fabric operable to service system cells carrying payloads associated with the first one of the plurality of traffic types prior to servicing system cells carrying payloads associated with other ones of the plurality of traffic types, wherein the plurality of ingress content processors associated with the first one of the plurality of traffic types automatically transports system cells carrying payloads associated with the first one of the plurality of traffic types to the switch fabric;

a plurality of egress content processors, each of the plurality of egress content processors associated with one of the plurality of traffic types, each of the plurality of egress content processors operable to convert system cells received from the switch fabric into a transport format associated with its associated one of the plurality of traffic types;

wherein an egress content processor associated with the first one of the plurality of traffic types includes a connection queue, the connection queue being precharged to accumulate a desired number of system cell bytes prior to generating the transport format associated with the first one of the plurality of traffic types in order to transport bytes associated with the first one of the plurality of traffic types in a periodic manner.

4. A system for forwarding information in a communications system, comprising:

a plurality of ingress content processors, each of the plurality of ingress content processors being associated with one of a plurality of traffic types, each ingress content processor operable to generate system cells carrying a payload associated with a respective one of the plurality of traffic types in response to receiving information in the respective one of the plurality of traffic types;

a switch fabric operable to receive a plurality of system cells from the plurality of ingress content processors, wherein system cells carrying payloads associated with a first one of the plurality of traffic types has a higher priority than system cells carrying payloads associated with other ones of the plurality of traffic types, the switch fabric operable to separately queue system cells carrying payloads associated with the first one of the plurality of traffic types from system cells carrying payloads associated with other ones of the plurality of traffic types, the switch fabric operable to service system cells carrying payloads associated with the first one of the plurality of traffic types prior to servicing system cells carrying payloads associated with other ones of the plurality of traffic types, wherein the plurality of ingress content processors associated with the first one of the plurality of traffic types automatically transports system cells carrying payloads associated with the first one of the plurality of traffic types to the switch fabric;

wherein the switch fabric includes a first queuing stage with a common queuing structure operable to process all system cells carrying payloads associated with any of the plurality of traffic types, the switch fabric including a second queuing stage with dedicated queuing structures each operable to process system cells carrying payloads associated with a particular one of the plurality of traffic types.

5. The system of claim 4, wherein the first queuing stage includes a high priority queue and a low priority queue, system cells carrying payloads associated with the first one of the plurality of traffic types being placed into the high priority queue, system cells carrying payloads associated with the other ones of the plurality of traffic types being placed into the low priority queue.

6. A system for forwarding information in a communications system, comprising:

a plurality of ingress content processors, each of the plurality of ingress content processors being associated with one of a plurality of traffic types, each ingress content processor operable to generate system cells carrying a payload associated with a respective one of the plurality of traffic types in response to receiving information in the respective one of the plurality of traffic types;

a switch fabric operable to receive a plurality of system cells from the plurality of ingress content processors, wherein system cells carrying payloads associated with a first one of the plurality of traffic types has a higher priority than system cells carrying payloads associated with other ones of the plurality of traffic types, the switch fabric operable to separately queue system cells carrying payloads associated with the first one of the plurality of traffic types from system cells carrying payloads associated with other ones of the plurality of traffic types, the switch fabric operable to service system cells carrying payloads associated with the first one of the plurality of traffic types prior to servicing system cells carrying payloads associated with other ones of the plurality of traffic types, wherein the plurality of ingress content processors associated with the first one of the plurality of traffic types automatically transports system cells carrying payloads associated with the first one of the plurality of traffic types to the switch fabric;

wherein the switch fabric is operable to establish connections associated with the plurality of traffic types, the switch fabric operable to add or delete connections without affecting existing connections associated with the first one of the plurality of traffic types.

7. A method for forwarding information in a communications system, comprising:

automatically receiving system cells carrying payloads associated with a first one of a plurality of traffic types;

receiving system cells carrying payloads associated with other ones of the plurality of traffic types upon being scheduled for transport;

queuing system cells carrying payloads associated with a first one of the plurality of traffic types separately from system cells carrying payloads associated with other ones of the plurality of traffic types;

servicing system cells carrying payloads associated with the first one of the plurality of traffic types before servicing any system cells carrying payloads associated with the other ones of the plurality of traffic types;

determining from which links system cells carrying payloads associated with the other one of the plurality of traffic types are received; generating scheduling information for system cells carrying payloads associated with the other ones of the plurality of traffic types from corresponding links.

8. A method for forwarding information in a communications system, comprising:

automatically receiving system cells carrying payloads associated with a first one of a plurality of traffic types;

receiving system cells carrying payloads associated with other ones of the plurality of traffic types upon being scheduled for transport;

queuing system cells carrying payloads associated with a first one of the plurality of traffic types separately from system cells carrying payloads associated with other ones of the plurality of traffic types;

servicing system cells carrying payloads associated with the first one of the plurality of traffic types before servicing any system cells carrying payloads associated with the other ones of the plurality of traffic types;

adding a new connection of system cells, the new connection of system cells not effecting the transport of existing connections of system cells.

9. A switch fabric for forwarding information in a communications system, comprising:

a multiplexer operable to provide system cells carrying payloads associated with any of a plurality of traffic types on an ingress high-rate link;

a first cell router operable to route each system cell according to a destination and traffic type associated with each system cell;

a first stage queue group operable to store system cells from the first cell router in a plurality of first stage queues, the first stage queue group operable to place system cells carrying payloads associated with a first one of the plurality of traffic types into a first stage high priority queue, the first stage queue group operable to place system cells carrying payloads associated with other ones one of the plurality of traffic types into a first stage low priority queue;

a second cell router operable to route system cells placed into the first stage high and low priority queues, the second cell router operable to service any system cell in the first stage high priority queue prior to any system cell in the first stage low priority queue;

a plurality of second stage queue groups each operable to store system cells from the second cell router in a plurality of second stage queues, a first one of the plurality of second stage queue groups operable to queue system cells for the first stage high priority queue, a second one of the plurality of second stage queue groups operable to queue system cells from the first stage low priority queue.

10. The switch fabric of claim 9, further comprising:

a bandwidth scheduler operable to control receipt of system cells carrying payloads associated with the other ones of the plurality of traffic types.

11. The switch fabric of claim 9, wherein the second one of the plurality of second stage queue groups includes a second stage high priority queue and a second stage low priority queue, the second one of the plurality of second stage queues operable to place system cells requiring a lower transfer delay into the second stage high priority queue and place system cells with less strict transfer delay requirements into the second stage low priority queue.

12. The system of claim 9, wherein the transfer of system cells carrying payloads associated with the first one of the plurality of traffic types is not affected by the presence of system cells carrying payloads associated with other ones of the plurality of traffic types.

13. The system of claim 9, wherein a depth of the first and second stage queues is determined according to a worst case burst scenario based on a number of inputs and connections for the switch fabric.

\* \* \* \* \*